US 7,536,316 B2

(12) United States Patent
Ozer et al.

(10) Patent No.: US 7,536,316 B2
(45) Date of Patent: May 19, 2009

(54) METHODS AND SYSTEMS FOR SELECTIVELY DISPLAYING ADVERTISEMENTS

(75) Inventors: Stuart Ozer, San Francisco, CA (US); Michael Patrick Hart, San Francisco, CA (US); Wei Wei Ada Cho, Mountain View, CA (US); Carolyn Khanh Chau, Campbell, CA (US)

(73) Assignee: Microsoft Corporation, Redmond, WA (US)

( * ) Notice: Subject to any disclaimer, the term of this patent is extended or adjusted under 35 U.S.C. 154(b) by 57 days.

(21) Appl. No.: 10/867,493

(22) Filed: Jun. 14, 2004

(65) Prior Publication Data

US 2004/0243470 A1  Dec. 2, 2004

Related U.S. Application Data

(62) Division of application No. 09/991,389, filed on Nov. 21, 2001, now Pat. No. 7,136,871.

(51) Int. Cl.
*G06Q 30/00* (2006.01)
(52) U.S. Cl. .......................................... 705/14; 725/35
(58) Field of Classification Search .................... 705/14
See application file for complete search history.

(56) References Cited

U.S. PATENT DOCUMENTS

| | | | |
|---|---|---|---|
| 5,155,591 A | 10/1992 | Wachob | |
| 5,446,919 A | 8/1995 | Wilkins | |
| 5,721,827 A * | 2/1998 | Logan et al. | 709/217 |
| 5,774,170 A | 6/1998 | Hite | |
| 5,825,876 A | 10/1998 | Peterson, Jr. | 380/4 |
| 5,920,700 A | 7/1999 | Gordon et al. | 395/200 |
| 5,999,912 A | 12/1999 | Wodarz | 705/14 |
| 6,012,984 A | 1/2000 | Roseman | 463/42 |
| 6,029,176 A | 2/2000 | Cannon | 707/104 |
| 6,134,532 A * | 10/2000 | Lazarus et al. | 705/14 |

(Continued)

FOREIGN PATENT DOCUMENTS

WO        WO9966719        12/1999

OTHER PUBLICATIONS

"Predictive Networks Launches ADirector iTV Advertising Management System At Cable 2001", Jun. 11, 2001, Business/Technology Editors. Business Wire.*

(Continued)

*Primary Examiner*—Jeffrey D Carlson
(74) *Attorney, Agent, or Firm*—Workman Nydegger

(57) ABSTRACT

A system, including a planning module, a control module and a receiver module, configured to schedule display of one or more advertising impressions of available advertising inventory. The planning module enables scheduling a requested quantity of advertising impressions in accordance with target criteria. Further, the planning module enables selecting an advertising impression goal for advertisement, assigning an advertising type and defining a weight for the advertisements. The control module receives the schedule, the advertising type and the defined weights and generates one or more metadata files that contain target criteria, advertising type and weights for the advertisements. The one or more metadata files, with the advertisements, are delivered to the receiver module that is configured to define a display frequency for the advertisements based upon one or more of the metadata files. The receiver module selectively displays advertisement content associated with the advertisements to achieve the advertising impression goal.

23 Claims, 9 Drawing Sheets

U.S. PATENT DOCUMENTS

| | | | |
|---|---|---|---|
| 6,141,010 A | 10/2000 | Hoyle | 345/356 |
| 6,144,944 A | 11/2000 | Kurtzman, II et al. | 705/14 |
| 6,286,005 B1* | 9/2001 | Cannon | 707/100 |
| 6,286,055 B1 | 9/2001 | Yamazaki | |
| 6,425,127 B1 | 7/2002 | Bates | |
| 6,510,417 B1 | 1/2003 | Woods | |
| 6,526,438 B1 | 2/2003 | Bienvenu et al. | 709/219 |
| 6,687,734 B1 | 2/2004 | Sellink | |
| 6,698,020 B1 | 2/2004 | Zigmond | |
| 6,813,775 B1 | 11/2004 | Finseth et al. | 725/46 |
| 7,103,563 B1 | 9/2006 | Voisin | |
| 2001/0013125 A1* | 8/2001 | Kitsukawa et al. | 725/36 |
| 2002/0049968 A1 | 4/2002 | Wilson et al. | 725/35 |
| 2002/0069407 A1 | 6/2002 | Fagnani et al. | 725/35 |
| 2002/0078444 A1 | 6/2002 | Krewin et al. | 725/35 |
| 2002/0083439 A1* | 6/2002 | Eldering | 725/32 |
| 2002/0104083 A1 | 8/2002 | Hendricks | |
| 2002/0128904 A1* | 9/2002 | Carruthers et al. | 705/14 |
| 2003/0074252 A1 | 4/2003 | Chandler-Pepelnjak et al. | 705/10 |
| 2003/0093792 A1 | 5/2003 | La beeb et al. | 725/46 |
| 2003/0101454 A1 | 5/2003 | Ozer et al. | 725/42 |
| 2003/0130887 A1 | 7/2003 | Nathaniel | 705/14 |
| 2004/0078809 A1 | 4/2004 | Drazin | 725/34 |
| 2004/0243623 A1 | 12/2004 | Ozer et al. | 707/102 |
| 2005/0021403 A1 | 1/2005 | Ozer et al. | 705/14 |
| 2005/0235318 A1 | 10/2005 | Grauch et al. | 725/46 |

OTHER PUBLICATIONS

Notice of Allowance dated Jul. 25, 2007 and cited in related U.S. Appl. No. 10,867,485.

Office Action dated Jan. 24, 2006 cited in U.S. Appl. No. 09/991,025 (Copy Attached).

Office Action dated Jul. 10, 2006 cited in U.S. Appl. No. 09/991,025 (Copy Attached).

Office Action dated Oct. 18, 2006 cited in U.S. Appl. No. 09/991,025 (Copy Attached).

Office Action dated May 3, 2007 cited in U.S. Appl. No. 09/991,025 (Copy Attached).

Office Action dated Sep. 24, 2007 cited in U.S. Appl. No. 09/991,025 (Copy Attached).

Office Action dated Mar. 28, 2008 cited in U.S. Appl. No. 09/991,025 (Copy Attached).

Office Action dated Sep. 11, 2008 cited in U.S. Appl. No. 09/991,025 (Copy Attached).

Office Action dated Jun. 8, 2004 cited in U.S. Appl. No. 09/991,389 (Copy Attached).

Office Action dated Jan. 26, 2005 cited in U.S. Appl. No. 09/991,389 (Copy Attached).

Office Action dated Jun. 2, 2005 cited in U.S. Appl. No. 09/991,389 (Copy Attached).

Office Action dated Nov. 3, 2005 cited in U.S. Appl. No. 09/991,389 (Copy Attached).

Office Action dated Mar. 8, 2006 cited in U.S. Appl. No. 09/991,389 (Copy Attached).

Notice of Allowance dated Aug. 24, 2006 cited in U.S. Appl. No. 09/991,389 (Copy Attached).

Office Action dated Dec. 13, 2006 cited in U.S. Appl. No. 10/867,485 (Copy Attached).

Notice of Allowance dated Nov. 29, 2007 cited in U.S. Appl. No. 10/867,485 (Copy Attached).

* cited by examiner

FIG. 5

| | | Ad Planning | | | | | | | □ - □ X |
|---|---|---|---|---|---|---|---|---|
| File | Edit | View | Favorites | Tools | Help | | | |

⇦ Back ▼ ⇨ ▼ ⊗ 🏠 | ◎ Search ⁕ Favorites ⏰ History | 📧 ▼ »   A<u>d</u>dress [▢ http://localhost/adtool/default.asp ▼] ⇧ Go

AD PLANNING PROTOTYPE:

[View Inventory] — 174      [Check Availability] — 176      [Book Ad] — 178

Start Date: [04/02/2001 ▼] — 180        End Date: [04/03/2001 ▼] — 182
From: [18:00 ▼] — 184          To: [20:00 ▼] — 185

Available Market Area:
```
BILLINGS
BILOXI-GULFPORT
BINGHAMTON
BIRMINGHAM (ANN AND TUSC)
BLUEFIELD-BECKLEY-OAK HILL
```
— 188

```
>>
>
<
<<
```
— 189

Selected Market Area:
```
Boston
```
— 190

170a

Ad Space: [All ▼] — 192    [Go] — 194

196

View Inventory

| Market Area ▼ | Ad Space ▼ | | | | | | | |
|---|---|---|---|---|---|---|---|---|
| BOSTON | All Page Group | | | | | | | |
| | Time 1 Hour Time ▼ | | | | | | | |
| | ⊞ 18:00 | | | ⊞ 19:00 | | | | |
| Date ▼ | Total Inventory | Total Committed Inventory | Total Available Inventory | Total Flexible Weight | Total Inventory | Total Committed Inventory | | |
| 04/02/2001 | 35 | 31 | 4 | 11 | 39 | 0 | | |
| 04/03/2001 | 25 | 0 | 25 | 100 | 33 | 2 | | |
| Grand Total | 60 | 31 | 29 | 48 | 72 | 2 | | |

▯ Done                                                             🌐 Internet

METHODS AND SYSTEMS FOR SELECTIVELY DISPLAYING ADVERTISEMENTS

CROSS-REFERENCE TO RELATED APPLICATIONS

This application is a divisional of U.S. application Ser. No. 09/991,389, filed Nov. 21, 2001, entitled "Methods and Systems for Selectively Displaying Advertisements," which is incorporated herein by reference.

BACKGROUND OF THE INVENTION

1. The Field of the Invention

The present invention generally relates to managing the delivery of advertising impressions on devices that are intermittently-connected to a network. More specifically, the present invention relates to planning an advertising campaign of advertisements, managing delivery of advertisement content associated with the advertisement to one or more receiver modules, and managing the selection of the advertisement, and associated advertising content, for display to a viewer.

2. The Relevant Technology

For many years, homes, offices, and other buildings have accessed broadcast programming through airwave broadcasts, cable providers, satellite transmission, and other communication channels. Televisions provide viewers with a varied assortment of entertainment, news, advertisements, and educational programming. From the first broadcasts to current television programming, viewers gather a wealth of knowledge while being entertained. With advances in communication technology and computer systems in recent years, viewers of broadcast programming no longer are limited to merely watching a television screen, but can utilize personal computers, or the like. Further, instead of merely watching the broadcast programming, viewers may participate in enhanced programming experiences through use of a set-top box or other similar device.

An advertiser desires to maximize revenue by enticing a viewer to purchase the product or services displayed in its advertisement. Hence, advertisers are willing to provide desirable consideration to those able to display their video advertisements to target viewers that are more likely to purchase the advertiser's products or services. While such advertising may sometimes seem bothersome to viewers, the presence of advertising often reduces the cost of viewers receiving broadcast programming. For example, many television channels are free, since revenue from advertising alone is sufficient incentive to provide the television channels. On the other hand, some premium channels present no advertisements, but instead achieve adequate incentives for providing the channel by charging the viewers a periodic fee.

The ability to target advertisements, such as video advertisements, audio advertisements, banner advertisements, static advertisements, combinations thereof, or the like, is of great value to advertisers. Targeting occurs by characterizing the segment of the population that is the most likely consumer of the product or service. Markets may be segmented by a myriad of characteristics such as gender, age, income, occupation, education level, special hobbies, geography, demographics, and so forth. By communicating the advertisement using those media that are more likely to be seen by the target market segment or target viewer, advertising is made more efficient.

For example, suppose a software developer manufactures a video game that tends to be attractive to men between 16 and 25 years old. In order to target the advertisement to the most likely consumer, the software developer may place a video advertisement on a television channel that tends to have male viewers between the ages of 16 and 25. By targeting in this manner, advertisers increase the chance of revenue on a per viewer basis. In addition, viewers tend to find the advertising more relevant. Thus, advertisers and viewers both may benefit by targeted advertising.

Further, advertisers typically want to deliver a precise number of impressions of the targeted advertisement, without over-delivering or under-delivering the advertisement. For instance, an advertiser may wish 5,000,000 people between the ages of 16 and 25 to watch that advertiser's advertisement at a specific time. Therefore, the advertiser wishes for 5,000,000 "impressions" of the advertisement to be displayed to the targeted market segment.

To facilitate the needs of these advertisers and maximize advertising revenue, broadcasters, as well as cable and satellite operators, want to avoid underutilization of available inventory, i.e., the expected number of advertising impression opportunities that can be reserved for advertisements, and hence want to ensure that 100% of the available inventory for the advertisement is sold. Although the broadcasters wish to maximize use of the advertising inventory, the broadcaster also attempts to avoid over-committing or over-subscribing the available inventory.

Further, broadcasters often want to manage two very different types of advertisements or advertising campaigns. The broadcaster manages high priced advertisements that the broadcaster commits to display in specific markets at specific times and at in specific locations, known as committed advertisements. The broadcaster allocates or schedules specific amounts of available advertising inventory for these specific advertisements or advertising campaigns. To fill in the remaining amount of available advertising inventory, the broadcaster manages low-priced advertisements or house advertisements, termed filler or flexible advertisements, which are to be displayed when advertising inventory is available and no committed advertisements are scheduled for such advertising inventory. The broadcaster attempts to avoid over-committing or over-subscribing committed advertisements for the available inventory, while avoiding under-committing or under-subscribing committed advertisements for the available advertising inventory.

In the conventional television environment, a broadcaster has a defined number of times for a specific period between breaks of broadcast programming. The broadcaster can only "sell" one time to one advertiser. Consequently, the advertiser can specify a number of timeslots that the advertiser's advertisement is to be displayed. Viewership within these timeslots is measured by standard TV Ratings data, which is then used to estimate a specific impression count. Broadcasters use these estimates to determine whether they over or undersold their advertisement inventory. Advertisers use this information to ensure that the number of impressions desired was met or exceeded.

The same goals of advertisers and broadcasters arise for delivering targeted advertisement via the Internet. Various other systems and methods have been developed to enable the advertiser and broadcasters to meet the above-referenced goals. For example, some systems utilize a centralized ad-server that delivers advertisement upon request from an application or web page at the moment that an ad is needed, makes a real-time decision of which ad to deliver, and tracks the delivery of advertising impressions. This decision is based upon the number of impressions requested by the advertiser, the number of impressions already delivered, the time remaining for the advertising campaign, and the targeting criteria of the advertisement.

New technology is permitting broadcasters to move away from the traditional limitations of delivering only a single advertisement to all households within a single timeslot. For example, new targeted advertising technologies allow broadcasters to deliver different advertisements to different households within a single timeslot, based on interest, location or demographics. Further, even the notion of a fixed timeslot is becoming obsolete. For example, new advertising opportunities arise when viewers use a broadcaster's Electronic Program Guide—which is accessed 'on demand' rather than during defined timeslots.

Unfortunately, with these new types of advertising campaigns, delivering a requested number of impressions for a specific advertiser becomes more problematic. There a lack of commercially-available TV Ratings data to determine the number of households matching a particular interest, location or demographic target viewing during a specific timeslot, so targeted advertising inventory becomes difficult to calculate. Similarly, TV ratings cannot reveal the quantity of advertising inventory available from visits to the Electronic Program Guide or other on-demand media on the TV. Technologies that have been deployed for Internet advertisement delivery are better suited for these new types of TV-based advertisements, but these technologies typically require a persistent 2-way online connection, while Satellite, Cable and other broadcasters are often at best only intermittently connected to their customers' set-top boxes for 2-way communication.

BRIEF SUMMARY OF THE INVENTION

According to one aspect of the present invention, a planning module is provided that enables broadcasters to schedule campaigns of advertisements for one or more advertisers, whether such advertisements are committed advertisements or flexible advertisements. This planning module utilizes historical advertising impression data and data representative of currently scheduled advertisements, which have an implied or estimated impression target, to generate a database of estimated advertising inventory, i.e., predicting the usage of advertising inventory based upon previously watched advertisements for specific target criteria, such as, but not limited to, geographic data, demographic data, and time data.

This planning module is configured to facilitate the creation of advertising placements to achieve an advertising impression goal, i.e., the particular number of times that the advertisement is displayed to a target audience. As the planning module is used to schedule display of advertisement to achieve the advertising impression goal, the planning module notifies the broadcaster of a conflict between currently scheduled advertisement and a requested advertising campaign's impression goal.

Through the planning module an administrator or individual can define the desired impression goal, display schedule, and target information for an advertisement and/or an advertising campaign. Further, the planning module provides a mechanism through which the administrator or individual can define the advertisement as either a committed advertisement, i.e., an advertisement that the broadcaster commits to display, or a flexible advertisement, i.e., an advertisement that the broadcaster will display based upon the remaining available advertising inventory for the requested targeted market segment. By so doing, the planning module facilitates maximizing available inventory by providing a mechanism for filling any advertising inventory remaining after scheduling of committed advertisements with flexible advertisements.

Once advertisements are scheduled and defined as either committed or flexible advertisements, planning module calculates and assigns the weights that are to be used by a receiver module, such as a set top box, or the like, to select from available advertisements to display to the viewer. For certain types of advertising, the administrator or individual may assign weights explicitly. These weights act as an indicator of the display frequency for the advertisement, i.e., the higher the weight the higher the display frequency or the more times advertisement content associated with the advertisement is displayed to a viewer through the receiver module. Examples of advertisement content include data included in graphics files, hypertext markup language (HTML) files, audio files, video files, and other audio and video data, which are used by the receiver module to present the advertisement to the viewer.

The derived or explicitly-assigned weights, along with the display schedule, target information, and advertising impression goal, are delivered to a control module to update a duplicate display schedule. Using the received data, the control module generates one or more metadata files associated with the advertisement. The metadata files define, in a structured format, the time when the advertisement is to be displayed, the weight or display frequency of the advertisement, the duration of display of the a advertisement, time-zone shifts to the display data, the advertisement content associated with the advertisement, and additional targeting information. Further, the metadata files include the type of advertisement where the advertising type indicates whether the advertisement is a committed advertisement or a flexible advertisement.

The control module delivers the advertisement, and more specifically, the advertisement content and the one or more metadata files associated with the advertisement, to the receiver module for selective display to the viewer. The receiver module is intermittently connected to the control module, and therefore receives the advertisement content and/or metadata files from the control module periodically, sporadically, or upon request from the receiver module.

Upon receipt of the advertisement content and the metadata, the receiver module deletes stored advertisement content and/or metadata files and substitutes the newly received advertising content and metadata files for the advertisement.

Subsequently, the receiver module displays the advertisement when needed by selectively displaying the advertisement's associated content based upon the target criteria, these absolute and relative weights, and whether the advertisement is committed or flexible advertisement. Consequently, the planning module, the control module, and the receiver module can schedule and subsequently display advertisements, and more specifically the advertisement content associated with the advertisement, to a viewer, while the modules are intermittently connected one with another.

Upon display of advertisement by the receiver module, a record of the display is generated and stored by the receiver module for reporting to the control module. These records of displayed advertising are aggregated and used to report on the status of the advertising campaign to the broadcaster and advertiser. The broadcaster or advertiser can use this information to judge the success of the advertising campaign or adjust the campaign as necessary. In addition, records of displayed advertising are used for inventory calculations for future advertising campaigns.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a schematic representation of a user interface used to view the inventory of available advertisements in accordance with the present invention;

DETAILED DESCRIPTION OF THE PREFERRED EMBODIMENTS

Figure 1:
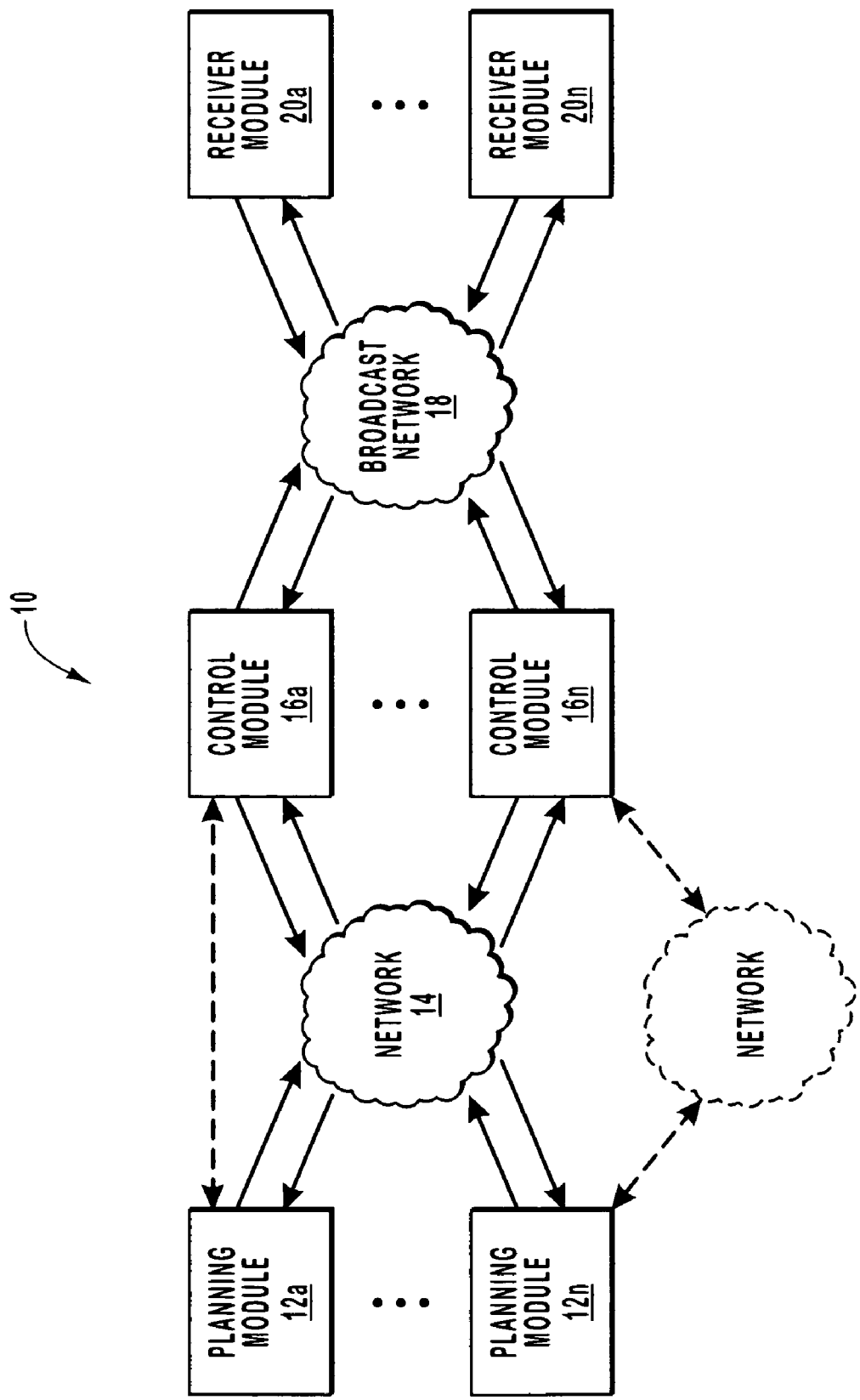
FIG. 1 illustrates a schematic representation of one exemplary system capable of utilizing the functionality of the present invention.

The present invention extends to systems and methods for scheduling the delivery of advertisements, including associated advertisement content and metadata files, to one or more receiver modules. Embodiments of the present invention provide systems and methods for scheduling the display of advertisements from the available advertising inventory to achieve an advertising impression goal. Therefore, embodiments of the present invention enable an advertiser to reserve inventory to meet an advertising impression goal and to schedule the display of the associated advertisements to fulfill the goal, and optionally resolving conflicts between newly requested advertising campaigns and currently scheduled advertising campaigns.

The term "advertising impression" refers to the single display of a single instance of an advertisement to a single household. Consequently, by defining 500,000 impressions, an advertiser wishes that the number of households who see the advertisement multiplied by the average number of times the advertisement is watched per household equals 500,000. The term "advertising inventory" refers to the total number of available impressions for a particular targeted market segment or target. The target is defined by a particular time, geographic area, viewer meeting demographic criteria, specific viewer interest areas or preferences (e.g. movies, sports, etc.), the type of activity or application running on the receiver (e.g. game, e-mail, electronic program guide, standard TV viewing, etc.), the genre of the television program being viewed, or the like.

Additionally, embodiments of the present invention facilitate creating historical data indicative of advertisements displayed and broadcast programming viewed by different viewers, at different times, and in different geographic areas. Utilizing this historical data, future advertising inventory can be estimated and used to schedule the display of advertisements to meet the advertising impression goal.

Furthermore, embodiments of the present invention generate one or more metadata files, each of which contains data and information specific to the advertisement and/or the advertising impression goal. For example, the one or more metadata files include data indicative of a weighting for the advertisements and/or the advertisement content associated with the advertisement displayable to a target viewer. These weights define a type of display frequency for the advertisement and the advertisement content associated therewith. For instance, advertisements having a higher weight are displayed more frequently than advertisements having a lower weight. Consequently, exemplary systems and methods enable advertisements to be selected for display by a receiver module based upon these weights.

Additionally, the metadata files include data representative of the advertising type. The advertising type indicates whether the advertisement is a committed advertisement or a flexible advertisement. The committed advertisement is an advertisement that a provider commits to display, while the provider selectively displays flexible advertisements for the remaining available advertising inventory for the requested targeted market segment. Weights associated with committed advertisements, and the associated advertisement content, are absolute weights, which guarantee an impression frequency, while weights associated with flexible advertisements, and associated advertisement content, are relative weights, which allocates remaining inventory among all flexible advertisements in proportion to the defined relative weights.

Additionally, embodiments of the present invention facilitate the selection of content for an advertisement by the receiver module for specified advertisement locations with respect to the demographic or geographic characteristics of the current user(s) of the receiver and the current time. Using the metadata, the receiver module identifies advertisements that are valid for a specified advertisement location and the current time. The receiver module then determines the absolute and relative weights associated with the current user(s) market area, demographic or geographic characteristics for committed and non-committed advertisements, respectively. In the event that the total of the committed ad weights indicates that the available inventory has not been fully utilized, non-committed advertisements are then assigned absolute weights based upon the available inventory relative to each non-committed advertisement's flexible weight as a proportion of the total flexible weight of all valid non-committed advertisements.

The embodiments of the present invention may comprise one or more special purpose or general-purpose computers, each of which can include computer hardware, as discussed in greater detail below. The embodiments of the present invention may further comprise multiple computers linked in a networked environment, where such network configuration is a local area network, a wide area network, a wireless network, the Internet, or the like.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by hardware devices, set-top boxes, receiver modules, other computers, or the like. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Referring now to FIG. 1, depicted is a schematic representation of one illustrative environment within which the features and functions of the present invention can be implemented. Although reference is made to the implementation of various features and functions of the present invention in the described environment, one skilled in the art can identify other environments that can benefit from one or more aspects of the present invention.

As illustrated, a system 10 is configured to facilitate scheduling, delivering, and displaying advertisements, and associated advertisement content, to one or more viewers in a prescribed manner to meet a requested number of advertising impressions selected by an advertiser. For instance, an advertiser can utilize system 10 to request an advertising campaign that displays advertisements, such as one or more audio advertisements, video advertisements, banner advertisements, combinations thereof, or, the like, to a targeted market segment or target viewer in a controlled manner. Consequently, the provider and the advertiser can define an advertising impression goal and schedule the display of advertisements to the targeted viewers to achieve the advertising impression goal.

Additionally, the provider of advertising inventory can schedule advertising campaigns in a controlled environment where substantially all available advertising inventory is filled with advertisements that must be displayed, i.e., committed advertisements, and advertisements that may be displayed in the event that advertising inventory is available, i.e., flexible advertisements. Further, the provider can resolve conflicts between a newly requested advertising campaign, and already-scheduled advertising campaigns to substantially achieve the desired advertising impression goal for the newly-requested campaign.

In the exemplary system of FIG. 1, system 10 includes one or more planning modules 12a-12n that communicate with one or more control modules 16a-16n through network 14, such as but not limited to, a wide area network, a local area network, a wireless network, the Internet, or the like. Each planning module 12a-12n provides a mechanism for scheduling advertising inventory to achieve an advertising impression goal for different targeted market segments, whether the market segment is defined by time, geographic location, i.e., local, regional, national, or international areas, demographic information, i.e., age, gender, educational background, occupation, presence of children in the household, income, or some other manner as known to one skilled in the art in light of the teaching contained herein.

Consequently, each planning module 12a-12n can display the available advertising inventory for a selected target, schedule an advertisement campaign displaying advertisements to achieve an advertising impression goal meeting the target criteria, facilitate querying of the available advertising inventory to verify the availability of inventory to achieve the advertising impressions for the target, indicate the overbooking of advertising inventory for a particular target, resolve conflicts associated with overbooking advertising inventory, or the like. Additionally, each a planning module 12a-12n facilitates the scheduling of advertisements to achieve an advertising impression goal based upon other criteria as can be identified by one skilled in the art in light of the teaching contained herein.

Each planning module 12a-12n utilizes a combination of historical advertising inventory data and currently scheduled advertisements to define an estimate advertising inventory and the availability of advertising impressions. The historical advertising inventory data, in one configuration, is collected by control module 16a-16n and periodically, sporadically, or continuously delivered to planning modules 12a-12n to update the scheduled advertising inventory stored therein. By aggregating the historical data and the currently scheduled advertising impressions, each planning module 12a-12n can generate an estimate of the available advertising inventory selectable by advertisers or campaign managers.

Receiving data from and delivering data to each planning module 12a-12n are control modules 16a-16n. Each control module 16a-16n stores the advertisement content, associated with the advertisement, to be displayed to target viewers and manages the delivery of the scheduled advertisement content for the advertisement in accordance with an advertising campaign defined by planning modules 12a-12n. Additionally, each control module 16a-16n receives historical data about the delivered advertising impressions, along with geographic, demographic or other target information from receiver modules 20a-20n. For instance, control modules 16a-16n receive a log of advertising impressions viewed and associated target criteria, such as but not limited to, type of application associated with the advertisement, time of day, broadcast programming or non-broadcast programming being viewed with the advertisement, demographic data about the viewer, geographic information, or the like.

In addition to receiving and delivering historical data, embodiments of control modules 16a-16n aggregate the received historical data and manipulate the same based upon the manner by which the historical data was collected by receiver modules 20a-20n. For instance, each control module 16a-16n may receive historical data from a sampling of a defined number of receiver modules 20a-20n, whether such defined number is generated by an administrator of control modules 16a-16n, some other individual having access to control modules 16a-16n, hardcoded within control modules 16a-16n, combinations thereof, or the like.

The sampling of receiver modules 20a-20n is sufficiently large to generate statistically significant aggregate data about any desired target. For instance, to measure advertising inventory and impressions to within 90% accuracy for a target audience that is 10% of the total number of households a sample of about 3500 receiver modules is sufficient. Smaller target audiences or greater accuracy require a larger sample. For example, measuring advertising inventory and impressions to within 95% accuracy for campaigns targeting 10% of the total number of households requires a sample of about 14,000 receiver modules. In the event that the target audience for a campaign is 2% of the total number of households (such as a small geographic region), sampling must be based on 19,000 receiver modules to achieve 90% accuracy, or 75,000 boxes to achieve 95% accuracy. These sample sizes are derived using standard statistical techniques as known to one skilled in the art. Further, other sampling sizes can be used depending upon the desired accuracy associated with the target audience.

Each control module 16a-16n can apply a rule or multiplier to the aggregation data to generate estimated data representative of all available receiver modules 20a-20n. The rules or multipliers vary based upon the particular sampling size, the number of impressions associated with the sample, the frequency of reporting, or the like.

This manipulated historical data is delivered to planning modules 12a-12n and used in scheduling future advertising campaigns. In this manner, the data is manipulated by planning modules 12a-12n to project the advertising inventory available based upon the particular target criteria, i.e., geographic location, viewer demographic information, times, days, broadcast event or program, or the like.

Although reference is made to the functionality of aggregating the historical data received from receiver modules 20a-20n being associated with planning modules 12a-12n, other embodiments of the present invention can incorporate such functionality within one or more of control modules 16a-16n or other modules of the present invention.

In addition to the above, control modules 16a-16n generate one or more metadata files associated with the advertisement and the advertisement content to be delivered to receiver modules 20a-20n. These metadata files define various properties, attributes, elements, or characteristics of the advertisement and/or the advertisement content, such as but not limited to, when the advertisement content associated with the advertisement is to be displayed to a viewer utilizing receiver modules 20a-20n. Illustratively, the metadata files further include data indicative of (i) weights assigned to the advertisement, and hence the advertisement content, (ii) the type of advertisement, and hence the advertisement content, i.e. whether the advertisement is committed or flexible, (iii) when the advertisement, and hence when the advertisement content is to be displayed, (iv) target information for the advertisement, and hence the target advertisement content, (v) the advertisement content to be delivered for the a advertisement, or the like.

Control modules 16a-16n deliver advertisement content and metadata files associated with the advertisements to receiver modules 20a-20n via broadcast network 18. In this exemplary embodiment, broadcast network 18 is a satellite network where data from control module 16a-16n is delivered to receiver modules 20a-20n via a communication line, such as electromagnetic transmission.

One skilled in the art can identify various other networks capable of performing the desired functions. For instance, broadcast network 18 can include a cable network for delivering data from control modules 16a-16n to receiver modules 20a-20n using cable lines, fiber optic lines, or the like, while utilizing a plain old telephone system (POTS) to deliver data from receiver modules 20a-20n to control modules 16a-16n. Alternatively, a cable connection, a wireless connection, an asymmetric digital subscriber line (ADSL) connection, Integrated Services Digital Network (ISDN) connection, Ethernet connection, or similar other connections known to those skilled in the art, can be used to deliver data and requests from receiver modules 20a-20n to control modules 16a-16n, and vice versa. Various other networks are known to those skilled in the art in light of the teaching contained herein.

Receiving data from and delivering data to control modules 16a-16n are receiver modules 20a-20n. Receiver module 20a-20n can intermittently receive data from control modules 16a-16n. Similarly, receiver module 20a-20n can intermittently deliver data to control modules 16a-16n. In alternate embodiments, the delivery of data to and/or from receiver module 20a-20n occurs periodically or continuously.

Each receiver module 20a-20n can comprise a special purpose or general-purpose computer or special purpose processing device including various computer hardware and/or software known by one skilled in the art for receiving signals or data from control modules 16a-16n, broadcast programming sources, or some other source for broadcast programming, advertisement content, interactive broadcast programming content, or the like. Exemplary receiver modules 20a-20n can include a cable television box, a digital video broadcasting system ("DVB"), some other type of digital satellite system receiver ("DSS"), other types of hardware devices including, but not limited to, cellular phones with a digital display, or any device with connectivity to a service wishing to deliver any range of advertising media, combinations thereof, or the like.

Generally, each receiver module 20a-20n is configured to receive advertisement content and metadata files from control modules 16a-16n. Each receiver module 20a-20n includes an ad engine that is capable of identifying the availability of advertisement content associated with a scheduled advertisement, selecting the advertisement content associated with the scheduled advertisement based upon the assigned weights, and initiate display of the advertisement content associated with the scheduled advertisement in an attempt to meet or fulfill the requested advertising impression goal. The ad engine determines which metadata file to use and selects the advertisement content associated with such metadata and other target criteria for the scheduled advertisement. Further, receiver modules 20a-20n, through the ad engine, remove any expired or non-current stored advertisement content and/or metadata files, analyze the particular times for displaying the advertisement content, and generate a queue or list of advertisement content that can be displayed to the viewer in accordance with the advertising weights and the space available for requested advertisements.

The receiver module 20a-20n, such as through the ad engine, identifies which specific advertisement or combination of advertisements to display when an ad impression is due to be shown on the screen. The selection is based upon whether the advertisement, in the list or queue of advertisements, is a committed or a flexible advertisement and the particular weights, whether absolute or flexible, for the advertisement. Each receiver module 20a-20n, in accordance with the selection made by the ad engine, displays the advertisement content associated with the committed advertisement in accordance with the available advertising inventory and the absolute weights of each committed advertisement, while the remaining advertising inventory is filled with the flexible advertisements based upon the relative weights of the available advertisements.

Illustratively, when an electronic program guide is being displayed to the viewer, it is possible for various advertisements to be simultaneously displayed to the viewer, such as in two different locations for advertisements. During the display of the instance of the electronic program guide, the ad engine selects first advertisement content of the first advertisement to be displayed in one location of the electronic program guide based upon whether the advertisement is a committed or a flexible advertisement and the weights of the advertisement. The ad engine removes the first advertisement content of the first advertisement from the queue or list of available advertisement content and subsequently retrieves second advertisement content of a second advertisement to be displayed in the second location from the queue or list that does not include the first advertisement content of the first advertisement. In this manner, the ad engine limits the possibility that the same advertisement content of the same advertisement is displayed in both locations of the electronic program guide.

When another instance of the electronic program guide is displayed, a new queue or list of available advertisement content is created that contains all available advertisement content for all available advertisements, whether or not such advertisement content has been previously been displayed. Although this is illustrative of one embodiment of the present invention, other embodiments of the present invention retain the advertisement content of the first selected advertisement with the list or queue and allow for duplicate showings of the advertisement content of the advertisement.

In addition to the above, each receiver module 20a-20n can track the number of advertising impressions displayed by receiver modules 20a-20n. For example, each time an advertisement is displayed to the target viewer, each receiver module 20a-20n generates a log of the displayed advertisements. This log is subsequently uploaded to control modules 16a-16n, whether periodically, sporadically, continuously, or the like, as historical data used to generate future schedules of advertising inventory and/or advertising impressions. Such historical data is also used to generate reports on the advertising campaign for use by the broadcaster or advertiser in analyzing the success of each campaign or to change the campaign as desired. In other embodiments, this type of tracking can be deferred until each receiver module 20a-20n determines to initiate the tracking, such as based on stored rules or information In addition to tracking the number of impressions, receiver modules 20a-20n can track viewer preferences and viewer demographic information. Illustratively, receiver module 20a-20n can periodically request information from the viewer of receiver module 20a-20n regarding income, location, age, gender, or the like, and update information stored at control module 16a-16n. Alternatively, such demographic information is gathered during installation of receiver module 20a-20n, purchases of programming packages from the cable or satellite providers, or the like.

Furthermore, each receiver module 20a-20n can track what advertisements, and associated advertisement content, is viewed. In the event that the viewer selects to view additional information about goods or services promoted through the advertisement, i.e., selects the advertisement and initiates a link to a web page or other previously stored content providing such additional information, receiver modules 20a-20n can track such actions. Optionally, receiver modules 20a-20n can track when a viewer performs a click-through operation by selecting displayed advertisement content of an advertisement for additional information about the goods or services promoted by the advertisement. Receiver modules 20a-20n, therefore, generate a log of the uniform resource identifier (URI) associated with the page displayed to the viewer based upon the viewer selecting the advertisement.

Figure 2:
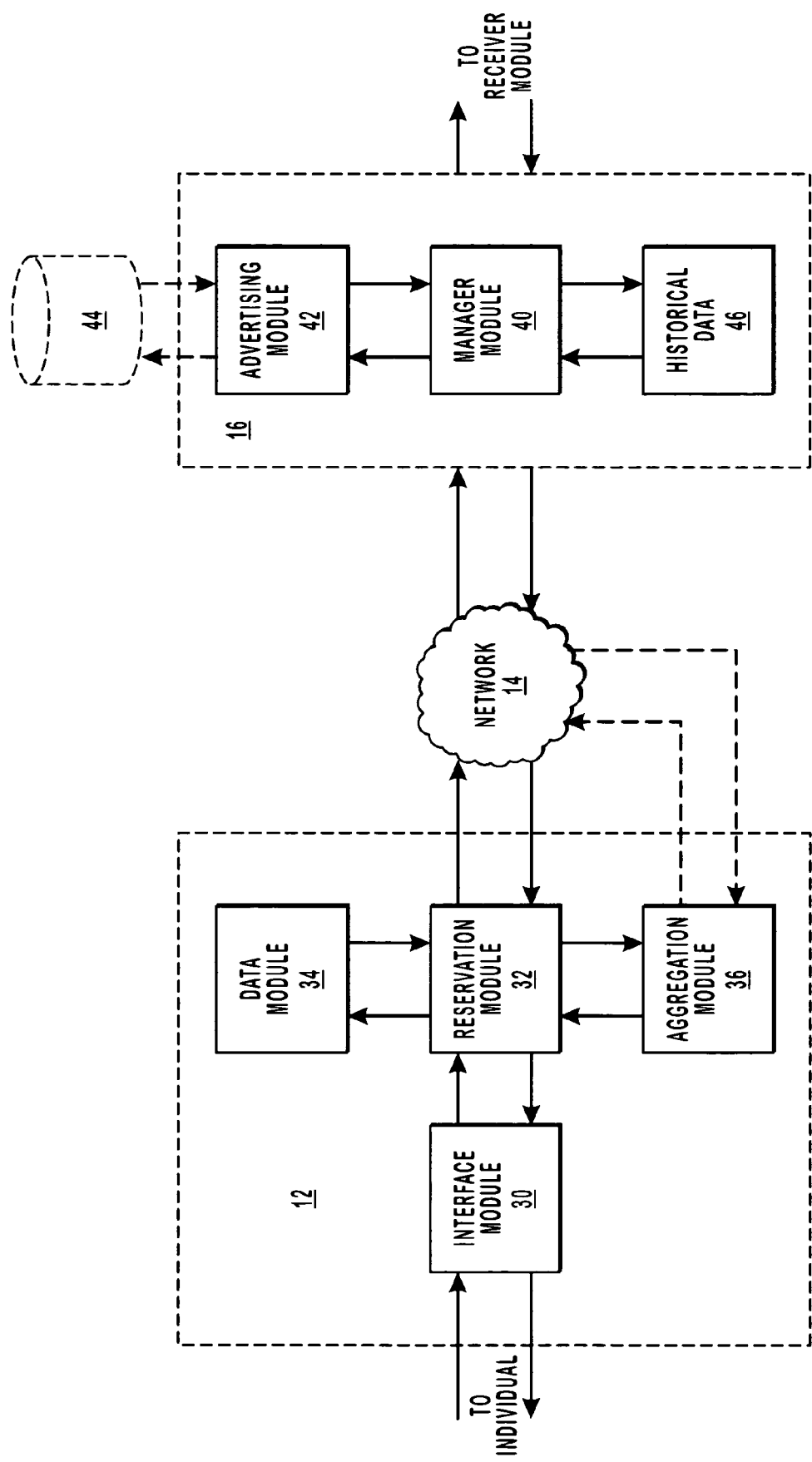
FIG. 2 illustrates a more detailed schematic representation of a portion of the exemplary system of FIG. 1.

Referring now to FIG. 2, depicted is a more detailed schematic representation of a portion of system 10. As shown, a single planning module 12 communicates with a single control module 16 via a network 14. Although the following discussion is directed to single modules and networks, it can be appreciated that a similar discussion can be made for systems that include multiple modules or networks.

As depicted, planning module 12 includes an interface module 30 in communication with a reservation module 32. Interface module 30 is configured to display information or data to an individual using planning module 12, and more specifically reservation module 32 and/or a data module 34, to schedule an advertising impression goal, i.e., a requested number of times that the advertisement is displayed to the targeted market segment or targeted viewer or household. This information or data is indicative of the availability of advertising inventory for the specific targeted market segment or target viewer.

Reservation module 32 manages the scheduling of advertising inventory and updates control module 16 with changes made to existing advertising inventory. Reservation module 32, therefore, is able to update the advertising inventory and retrieve information or data from data module 34 storing the advertising inventory.

The advertising inventory information stored within data module 34 can be stored in a variety of different configurations. Data module 34, in one embodiment, is a multi-dimensional database that links multiple attributes, elements, properties, or the like together in such a manner that the information is accessible to modules accessing the database. For example, the database can store advertising inventory in accordance with different target criteria. The target criteria can include, but is not limited to, information about the times when an advertisement is to be displayed to an individual using receiver module 20, the market area, the location on the screen where the advertisement is to be displayed, and the time when the advertisement is to be displayed to a viewer.

Figure 3:
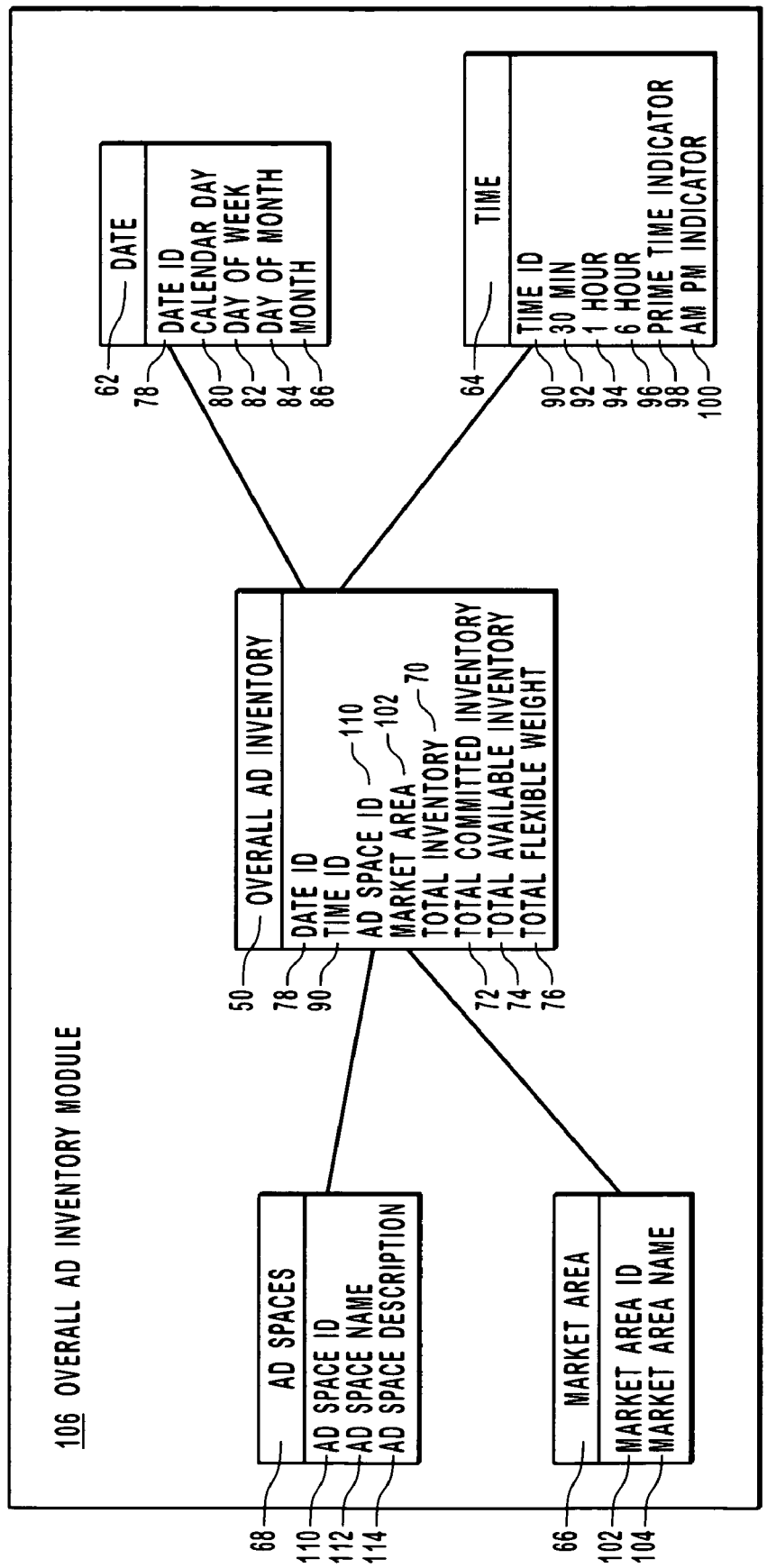
FIG. 3 illustrates a schematic representation of one data structure of an overall ad inventory module of the planning module of the system of FIG. 1.
Figure 4:
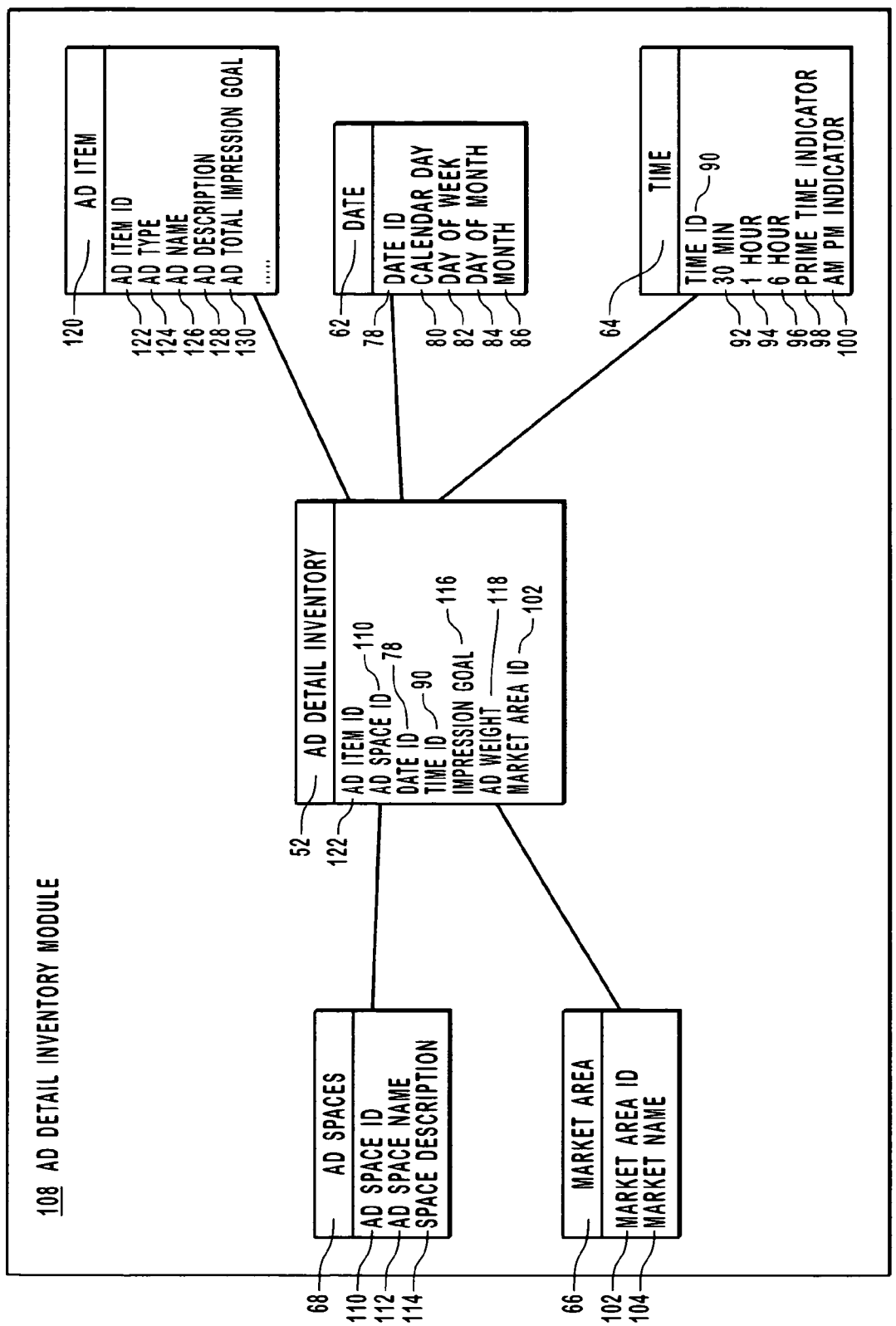
FIG. 4 illustrates a schematic representation of one data structure of an ad detail inventory module of the planning module of the system of FIG. 1.

In the preferred embodiment of the invention, information stored within data module 34 is divided into two sub-modules: overall advertising inventory module 50, illustrated in FIG. 3, and advertising detail inventory module 52, illustrated in FIG. 4. Overall inventory data module 50 provides a summary view of advertising impression inventory and scheduled advertising campaigns, including information about the total number of advertising impressions available, total number of advertisements that have been scheduled as committed, total number of scheduled flexible advertisements and the total weight of flexible advertisements for any defined target criteria. The data associated with overall inventory data module 50 varies based upon the particular target criteria selected by a user of planning module 12. Stated another way, the data associated with overall inventory data module 50 will vary based upon the particular dimensions of the multi-dimensional data store accessible by planning module 12 based upon criteria associated with the targeted viewer, the day, time, ad space of the advertising impression, market area, or the like.

In contrast, advertising detail inventory module 52 provides detailed scheduling information for each scheduled advertisement. Information relating to each advertisement includes the total impression goal and advertising weight for any defined target. Advertising detail inventory module 52 also contains information about the advertising type for each scheduled advertisement. In a similar manner to overall advertising inventory module 50, the data associated with advertising detail inventory module 58 varies based upon the particular target criteria for the specific scheduled advertisement. Stated another way, in this illustrative embodiment, each scheduled advertisement will have different values from a date dimension 62, a time dimension 64, a market area dimension 66, an ad space dimension 68, and an ad item dimension 120.

An exemplary data structure of overall advertising inventory module 50 is illustrated in FIG. 3. Illustratively, overall advertising inventory module 50 receives data from date dimension 62, time dimension 64, marketing area dimension 66, and ad space dimension 68. The data stored within overall advertising inventory module 50 is representative of any combination of values of date dimension 62, time dimension 64, marketing area dimension 66, and ad space dimension 68. Each combination of values is unique for a particular advertising campaign and/or scheduled advertisement. The particular embodiment of data module 34 will be discussed with respect to a relational database; however, one skilled in the art can appreciate that data module 34 can store the data in a variety of other structures, such as but not limited to, a multidimensional data cube, an OLAP data store, or the like.

As shown, module 50 includes a total inventory attribute 70. The total inventory attribute 70 defines the quantity of all available inventory for which advertising impressions can be scheduled for different target criteria. Similarly, a total committed inventory attribute 72 describes the number of advertising impressions scheduled, i.e., the advertising inventory committed to one or more advertisers. Another attribute of module 50 is the total available inventory attribute 74. Attribute 74 defines the number of available advertising impressions, i.e. inventory that has not been scheduled for committed advertisements. In other words, attribute 74 defines the number of available advertising impressions for advertisers to schedule new advertisements and is the difference between total inventory 70 and total committed inventory 72. The total flexible weight attribute 76 defines the sum of relative weights of scheduled flexible advertisement content at each defined target.

FIG. 4 defines the data structure of advertising detail inventory module 52. Attributes of module 52 define the different advertisements scheduled and associated advertising inventory reserved for each advertisement. As shown, impression goal attribute 116 defines the number of advertising impressions scheduled to be delivered to viewers of the defined target for the specific advertisement. Ad weight attribute 118 represents either the absolute or relative weight of the advertisement depending on the type of the advertisement as described in ad type attribute 124 of ad item dimension 120. In the event that the advertisement is scheduled as a committed advertisement, ad weight attribute 118 represents the absolute weight for the advertisement, and hence the advertisement content associated with the advertisement. Conversely, in the event that the advertisement is scheduled as a flexible advertisement, attribute 118 represents the flexible weight of the advertisement, and hence the advertisement content associated with the advertisement.

The multi-dimensional structures of sub-modules 50 and 52 enable linking of different dimensions of the database. For example, when a number of advertising impressions are selected for particular times and geographic areas, links are formed between one or more time attributes and geographic area attributes associated with a specific advertisement or sets of advertisements, i.e., the inclusion of one or more linking or common fields or attributes that connect overall advertising inventory module 50 or advertising detail inventory module 52 with each date dimension 62, time dimension 64, marketing area dimension 66, ad space dimension 68, or the like that defines the particular market area, demographics, impression goal. These linkages between dimensions define cells within the multi-dimensional structures of sub-modules 50 and 52 that describe sets of target viewers. The same set of dimensions is shared by module 50 and 52 with one exception: module 52 has one extra link to the ad item dimension 120.

Overall advertising inventory module 50 and advertising detail inventory module 52 both include a date attribute 78 that links overall advertising module 50 or advertising detail inventory 52 to data dimension 72. The data attribute 78 defines the particular date when the advertisement is to be displayed to the specific target market segment, target viewer, target household, or the like. Date dimension 62 defines the scheduled day for displaying the advertisement. For instance, date dimension 62 includes one or more sub-attributes that define the specific calendar day, day of the week, day of the month, particular month, combinations thereof or the like, as represented by sub-attributes 92-96.

Another dimension associated with overall advertising inventory module 50 and advertising detail inventory module 52 is time dimension 64. Time dimension 64 defines the specific times when the scheduled advertisement is displayable to achieve the desired number of advertising impressions. Time dimension 64 includes a time attribute 90 that defines the particular time period represented by the data identified by overall advertising inventory module 50. This time attribute 90 links time dimension 64 to overall advertising inventory module 50. For instance, time dimension 64 can include various attributes, such as but not limited to, an attribute defining the number of times the advertisement content is to be displayed in a 30 minute period, 1 hour period, and a 6 hour period, i.e., 30 min attribute 92, hour attribute 94, and 6 hour attribute 96 respectively. Additionally, time dimension 64 can include attributes to define whether the advertisement, and hence the advertisement content associated with the advertisement, is to be displayed at primetime, in the morning or in the afternoon or evening, i.e., attributes 98 and 100 respectively. In alternate embodiments, time dimension 64 includes attributes that allow scheduling of advertising impressions for time ranges of one minute or greater.

Marketing area dimension 66 is another dimension associated with overall advertising inventory module 50 and advertising detail inventory module 52. This dimension defines the particular market area where the advertisement is to be displayed to fulfill the advertising impression goal. As with the other dimension of the present invention, market area dimension 66 includes a market area ID 102 that defines the selected or defined market area associated with the scheduled advertising campaign. Further, market area dimension 66 includes a name attribute 104 that defines the display name of each market area, i.e., the name displayed to a user of planning module 12a-12n identifying a specified target area. In addition to the above, market area dimension 66 optionally includes attributes that define various properties of the available the market area, such as but not limited to, a market area rank, market area size, market area population, number of households within the market area, the average household size, the average household income, the population of the market area by category (i.e., population having ages 0-14, 15-24, 25-44, 45-54, 55 and above), demographic details, geographic properties of the market area, or the like, that are illustratively combined in market area description 102. In alternate embodiments, such properties can be associated with individual attributes of market area dimension 66.

Another dimension of overall advertising inventory module 50 and advertising detail inventory module 52 is the ad space dimension 68. As the name suggests, this dimension defines the particular advertising space where the advertisement is to be displayed to fulfill the advertising impression goal. Stated another way, ad space dimension 68 defines where, on a displayable screen, image, frame, frameset, or the like, the advertisement is to be displayed to the viewer. For instance, ad space dimension 68 can define that during broadcast programming, the advertisement can be displayed in the left-hand, upper corner of the viewable portion of video image. Similarly, ad space dimension 68 can define that advertisement is displayed at an upper, right-hand corner of an electronic program guide, a displayed web page associated with an enhanced programming experience, during a video game, movie review page, or the like. Consequently, ad space dimension 68 includes an ad space ID 110 that uniquely defines each available ad space in such a way that planning module 12 can search for these unique definition in a simple and efficient manner. In contrast, an ad space name attribute 112 defines unique names that are displayable through the user interface associated with planning module 12. For example, the simple names for each advertising space can include, but are not limited to, upper left-hand corner, upper right-hand corner, lower left-hand corner, lower-right hand corner, upper portion, lower portion, right portion, left portion, center portion, combinations thereof, of the like.

In addition to the above, ad space dimension 68 can include an ad space description attribute 114 that provides an easily understandable definition of the particular location where the advertisement is to be displayed. For instance, the description associated with ad space description attribute 114 can identify that the ad space is in the upper left-hand corner of an EPG, upper right-hand corner of a displayed movie review, lower left-hand corner of a game screen, lower-right hand corner of displayed broadcast programming, upper portion of enhanced programming, or the like.

Referring now to FIG. 4, advertising detail inventory module 52 includes one additional dimension: advertising item dimension 120. This dimension contains an entry for each advertising item scheduled for display. Consequently, dimension 120 includes an ad ID 122 that defines each of the available advertisements uniquely to allow planning module 12a-12n to schedule such advertisements and enable control module 16a-16n to select the same, and receiver module 20a-20n to identify and thereafter display the advertisement content associated with the advertisement. The dimension 120 further includes advertising type attribute 124, advertising name attribute 126, advertising description attribute 128, and advertising total impression goal 130 describing the advertising item.

Advertising type attribute 124 defines whether the advertising item is committed to be displayed, or flexibly displayed. An advertisement that is committed to be displayed will be displayed frequently enough among the overall target audience to achieve the impression goal, while an advertisement that is flexible may be displayed when the available advertising inventory is not completely filled with committed advertisements. In the event that advertising type attribute 124 is undefined, planning module 12 designates the advertisement as flexible so that no unintended advertisement is defined as being committed.

Advertising name attribute 126 defines the name of the advertising item, while advertising description attribute 128 defines a description of the advertisement associated with the advertisement defined by advertising name attribute 126 and ad ID 124.

Another attribute is advertising total impression goal 130. This attribute defines the total number of advertising impressions to be displayed for the specific advertisement, i.e., the advertising impression goal.

In addition to including values associated with ad item dimension 120, advertising detail inventory module 52 includes an impression goal attribute 116 and an ad weight 118. The impression goal attribute 116 defines the specific advertising impression goal for the specific combination of values from date dimension 62, time dimension 64, market area dimension 66, ad space dimension 68, and ad item dimension 120. The ad weight attribute 118 is the specific weight for the scheduled advertising impression defined by the values contained within advertising detail inventory module 52. Depending upon the particular advertising type defined by ad type attribute 124, the weight defined by ad weight attribute 118 can be a relative weight, such as when ad type attribute 124 defines the advertising impression as flexible, or can be an absolute weight, such as when ad type attribute 124 defines the advertising impression as committed.

Stated another way, an advertisement designated as committed advertisement, and hence the advertisement content of the advertisement contains an absolute weight value based upon a total advertising base factor. For example, the absolute weight value can be a value between 0 and 100, calculated by planning module 12 based on comparing the impression goal to the total inventory for that advertisement's target during the campaign's duration and representing the percentage of inventory to be filled by this advertising. Similarly, an advertisement designated as flexible includes a relative weight value of between 1 and 100. Non-committed advertising inventory is filled by the available flexible content in proportion to their relative weights. By defining weights for the advertisement content, a broadcaster can, in a detailed manner, define different levels of committed advertisement and flexible advertisement. For instance, a committed advertisement weighted closer to 1 will be displayed to the target audience less often than a committed advertisement closer to 100. Similarly, a flexible advertisement closer to 1 will be displayed to the target audience less often than a flexible advertisement closer to 100.

Although ranges are given for values of the committed and flexible advertising weights, it can be understood that the numbers used to define weights, whether committed or flexible, by ad weight attribute 118 can be implemented using any base factor or desired scale of numbers. Illustratively, the weights for committed and flexible advertisement can be defined using a base factor of 1000, i.e., weights are defined by values between 0 and 1000.

It can be appreciated by one skilled in the art, that various other targeting criteria can be associated with scheduled advertisements, such as but not limited to, target viewer interest areas or preferences (e.g. movies, sports, etc.), the targeted type of activity or application running on the receiver (e.g. game, e-mail, electronic program guide, standard TV viewing, etc.), the targeted genre of the television program being viewed, or the like. Implementing additional target criteria entails adding additional dimensions that define various properties and attributes of the target criteria, whether or not such additional dimensions are included in both the overall advertising inventory module 50 and advertising detail inventory module 52.

Generally, data module 34 can be hierarchal, relational, flat, or other database structure, including related database management systems (not shown). Such data module 34 can utilize modular or fixed memory, magnetic storage disks, CDRW, optical storage media, or other mass storage for storing the information and data.

Returning to FIG. 2, reservation module 32 is configured to notify an individual utilizing interface module 30 when advertising inventory is overbooked for requested target criteria. For instance, as the individual defines the advertising impression goal and specific target criteria associated with the requested advertising campaign, reservation module 32 compares current advertising inventory availability against the requested impression count and target criteria. Based upon this comparison, reservation module 32 identifies the various conflicts between the requested and currently committed advertising inventories.

In the event that there is sufficient remaining available inventory (e.g. inventory not yet committed) to meet the impression goal of the requested advertising campaign, given the target criteria, reservation module 32 reserves the appropriate proportion of total advertising inventory—meeting the target criteria—for the requested advertisement and campaign. Further, reservation module 32 marks the times and target information as being reserved for the particular campaign.

Reservation of committed advertisements using reservation module automatically assigns the particular advertising campaign with a weight. This weight, in one embodiment, is equal to the advertising impression goal for the campaign divided by the total number of available impressions for defined target criteria. Consequently, the individual scheduling the advertising impression weights the campaign as a whole. Therefore, in one embodiment, when receiver module 20 determines the particular order or frequency to display the advertisement, and associated advertisement content, to achieve the advertising impression goal, advertising campaigns with greater weights can be displayed more often than other campaigns. In other embodiments, an individual may specify the desired weight directly.

Alternatively, an advertiser may request a campaign involving more than one advertisement. In this case, each advertisement in the campaign may be treated separately, each advertisement having its own committed or flexible weight rather than having a single weight for the entire campaign. Consequently, when receiver module 20 determines the particular order or frequency to display the advertisement, receiver module 20 treats each advertisement separately regardless of the number of advertisements within a campaign. In this case, the frequency or order of display is determined at the individual advertisement level rather than at the campaign level.

The weight defined by the individual can be an absolute weight for committed advertisements, or a relative weight for the flexible advertisements. The relative weights of the advertisements are used to select flexible advertisements to be displayed by receiver modules 20*a*-20*n* when committed advertisements do not fill the available advertising inventory. These relative weights are used to define the display frequency of the available flexible advertisement for the remaining advertising inventory.

According to another aspect of the present invention, the absolute weights defined by the individual can be used to define the display frequency of the committed advertisement when a provider has overbooked the available advertising inventory. For instance, when an individual overbooks advertising inventory for a particular time period, the absolute weights of committed advertisements are used to define the display frequency for the committed advertisements. An example of such usage of the absolute weights is provided hereinafter.

To limit the potential for overbooking of advertising inventory, reservation module 32 delivers a notice to the individual scheduling advertising impression goals indicating that particular times are "overbooked," i.e., two or more different campaigns are scheduled for the same time with impression targets that exceed available inventory. Although the individual receives such notification, the individual can override the notification and schedule the new campaign, thereby overbooking a particular time.

In another embodiment of the invention, when a potential for overbooking is found by reservation module 32, reservation module 32 provides the individual with the ability to divide the requested campaign into two or more sub-campaigns to avoid over booking. For example, this event can occur when an advertiser wishes to schedule a campaign for a duration of 2 weeks in a particular geographic area but less or no committed advertising inventory is available during the first week in the requested geographic area. When the individual attempts to schedule the campaign, reservation module 32 alerts the user of the conflict in the first week. In the case when there is less committed advertising inventory available in the first week, reservation module 32 allows the user to schedule the campaign with a different weight in the first week, reflecting the lower available inventory. In the case when no committed advertising inventory is available during the first week, reservation module 32 provides the user with the option to divide the campaign into two sub-campaigns. During the first week when there is no available committed advertising inventory, reservation module 32 provides the individual with the option of scheduling the advertisement as flexible inventory, to schedule the advertisement at a different time of day, or the like. During the second week, when committed advertising inventory is available, the user schedules the campaign with a large-enough impression target to meet the overall campaign goal. In this way, reservation module 32 effectively divides the originally requested campaign into two or more sub-campaigns as necessary to best meet the impression goal.

Alternatively, other embodiments of the present invention avoid overbooking by preventing the individual from scheduling two or more campaigns for the same time, in the same area, to the same viewers in a way that exceeds available inventory. Further, although reference is made to dividing a two week advertising campaign into two separate week long advertising campaigns, one skilled in the art can understand that reservation module 32 can be configured to divide a campaign into any number of sub-campaigns, including allowing modifying of advertising type and weights on a per advertising day basis, per time-slot basis, per-market area basis, or on the basis of any dimension of the multi-dimension structure associated with data module 34 and/or planning module 12. Additionally, reservation module 32 can perform various other options or functionality as known to one skilled in the art in light of the teaching contained herein.

In addition to scheduling advertising impression goals for committed advertisements, reservation module 32 is capable of reserving advertising impression goals for flexible advertisements. The flexible advertisement is shown when the amount of committed advertisements is less than the available advertising inventory. The flexible advertisement includes a relative weight that defines the relative likelihood of showing the flexible advertisement compared to all other flexible advertisement available and meeting the target criteria. In this manner, advertisements, whether committed or flexible, are always displayed to the viewer.

Figure 6:
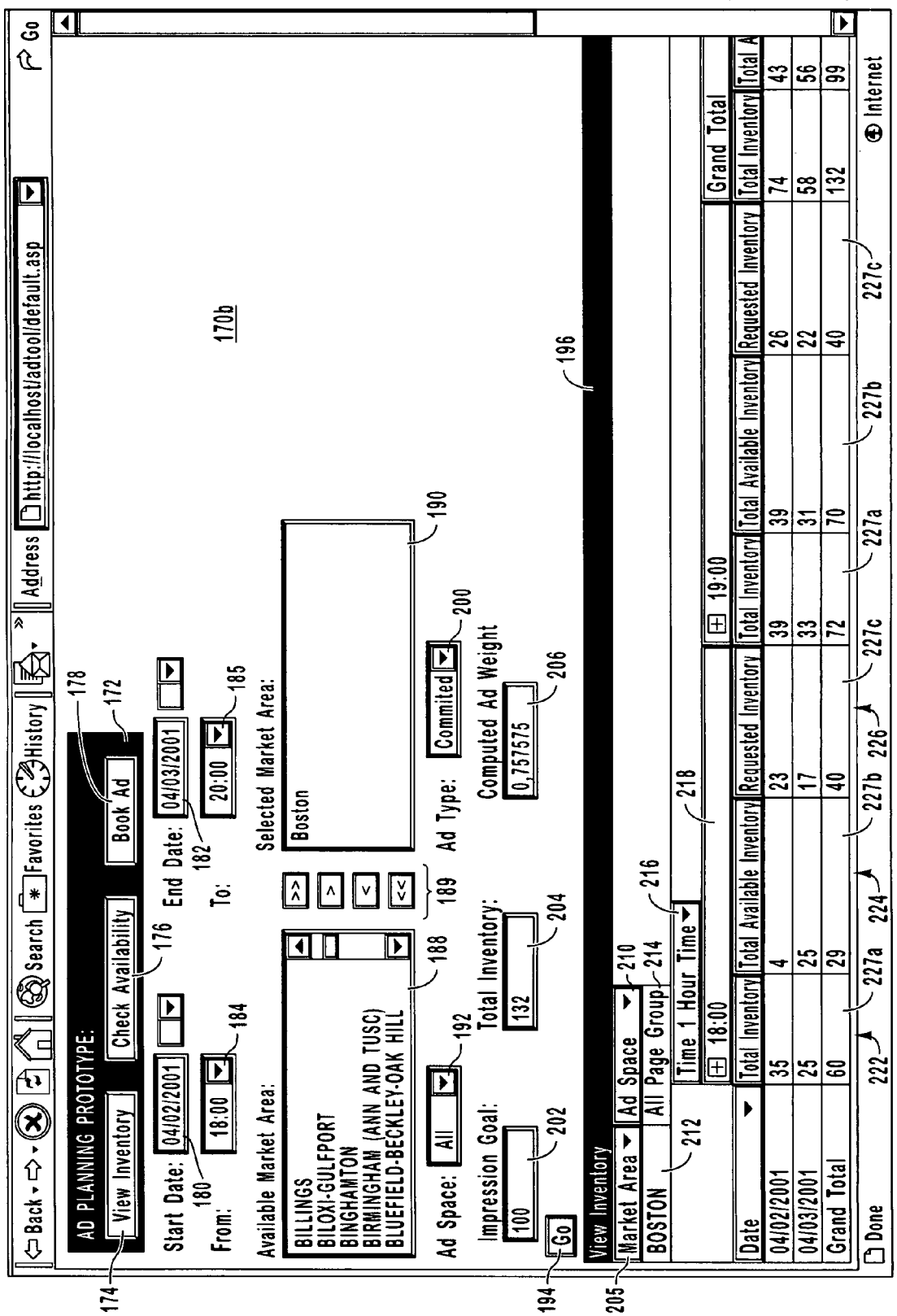
FIG. 6 illustrates a schematic representation of a user interface used to check the availability of advertisements in accordance with the present invention.
Figure 7:
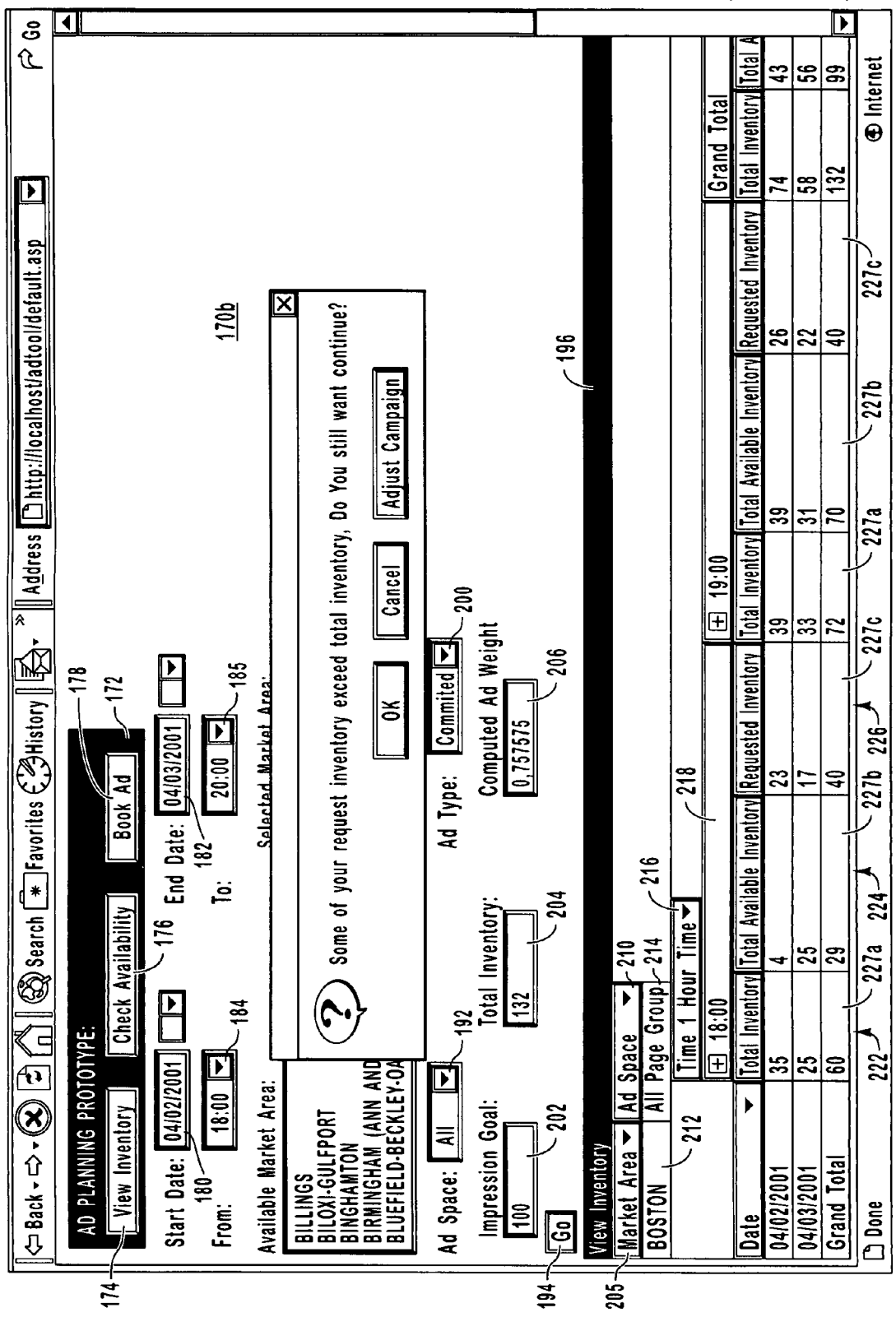
FIG. 7 illustrates a schematic representation of another user interface of the present invention.

While reservation module 32 generates information and data regarding scheduled advertising campaigns, availability of advertising inventory, or the like, interface module 30 displays such information through a graphical display. Illustrated in FIGS. 5-7, are embodiments of exemplary graphical displays through which a user can view inventory, check availability of advertising inventory, and schedule advertising campaigns. The following discussion will be made to a user progressing from viewing available inventory, viewing available inventory for a specific campaign, to booking the advertising campaign.

With reference to FIG. 5, illustrated is a graphical display, as referenced by numeral 170a, depicting the information that is presented to a user of planning module 12 upon the user selecting to view inventory that matches the criteria selected by the user. As shown, graphical display 170a includes a selection bar 172 through which a user can select to view inventory using button 174, check the availability of advertising impression count, i.e., advertising inventory, using button 176 or book advertising inventory to schedule a number of advertising impressions using button 178. Although reference is made to using buttons, one skilled in the art can appreciate that the recited functionality can be initiated through other types of interface, such as but not limited to, drop down menus, check boxes, or the like.

The graphical display 170a includes a start date field 180 and a stop date field 182. These fields 180, 182 are selectable by the user to define particular dates for which a user wishes to view available advertising inventory. These same fields 180, 182 can also define those dates for which a user wishes to check the availability of advertising inventory for a defined advertising campaign (FIG. 6) and those dates for which a user wishes to book advertising inventory for a desired advertising campaign (FIG. 7). Generally, the functionality of fields 180, 182 remains the same, with other portions of graphical display 170a being changes based upon the particular button selected from tool bar 172. Although reference is made to selecting a date, one skilled in the art can appreciate that the user can enter a date into the field or select from a drop down calendar to define the specific date.

To further define the particular advertising inventory that a user wishes to view, the user can define start and stop times through start time 184 and stop time 185. For instance, an advertiser may wish to view advertising inventory for an advertising campaign that is to display a desired advertisement to achieve a defined number of impressions between 7:00 pm and 9:00 pm during the campaign period defined by start date field 180 and stop date field 182.

To enable the user and/or advertiser to define a particular marketing area for the advertising inventory to be displayed, graphical display 170a includes an available market area field 188 and a selected market area field 190. Displayed within available market area field 188 is a list of areas within which a campaign can be commenced. The names displayed within field 188 are those names defined within market area dimension 66 (FIGS. 3 and 4).

A user and/or advertiser through use of an input device, such as a joystick, mouse, keyboard, or the like, can select one or more market areas for which the available advertising inventory can be viewed. Those market areas, such as but not limited to, geographic regions, selected by the user through manipulating one or more controls 189 are displayed in a selected market area field 190.

In addition to the above, graphical display 170a includes an ad space field 192 that is associated with ad space name 112 (FIGS. 3 and 4) and more generally ad space dimension 68. Through this field, an advertiser selects the particular location(s) for which the advertiser wishes to view available advertising inventory. As illustrated, the user can select to view all available ad spaces for the particular market area, time, and days.

Following defining each of the above-described fields illustrated in FIG. 5, the user and/or advertiser can select button 194 to cause planning module 12 and more specifically reservation module 32 to analyze the criteria defined in the various fields and return the overall advertising inventory matching the defined criteria in a display region 196. The user and/or the advertiser can review the displayed advertising inventory to identify potential advertising inventory that the advertiser may wish to utilize. Illustratively, display region 196 displays the total inventory on a time and day basis, i.e., on April $2^{nd}$ and $3^{rd}$ between 18:00 and 20:00. The display region 196 also displays the inventory that is committed, the available inventory, and the flexible weights for the available inventory.

After reviewing the available inventory for selected criteria, the viewer and/or advertiser can check the availability of advertising inventory for more specifically defined criteria, such as through graphical display 170b illustrated in FIG. 6. The graphical display 170b includes the same fields and functionality of graphical display 170a, while including additional fields that enable the user and/or advertiser to define further criteria for an advertising campaign.

To enable the user and the advertiser to define whether the requested number of impressions is to be guaranteed or not, graphical display 170b includes an ad type field 200. Through this ad type field 200, a user or advertiser can define the advertisement as flexible or committed. This ad type field 200 is associated with ad type attribute 124 and more generally the ad item dimension 120 of data module 34 (FIGS. 2-4).

The graphical display 170b allows the user and/or advertiser to define an impression goal for the advertisement associated with the advertising campaign through use of an impression goal field 202. Further, graphical display 170b includes a total inventory field 204 that defines the total available inventory for the criteria defined by the fields of graphical display 170b. The value for total inventory field 204 is generated by planning module 12 upon the user and/or advertiser selecting to check availability of advertising inventory, whether this is initiated through selecting button 176 or through selecting the "GO" button 194.

In addition to calculating a value for total inventory field 204 upon selecting the "GO" button 194, or one of the other buttons associated with selection bar 172, planning module 12 generates the advertising weight for the advertisement and displays the same in a computed ad weight field 206. Further, planning module 12 generates a grid of total inventory, total available inventory, requested inventory based upon the selected impression goal and computed ad weight, and grand totals for the same, the grid with display region 196. This grid also indicates, such as through highlighting particular fields of the grid, where there is a conflict between the requested advertising inventory and the available advertising inventory.

Although reference is made to highlighting particular fields, one skilled in the art can identify various other manners or means for identifying a conflict between requested advertising inventory and available advertising inventory.

As illustrated, the grid within display region 196 includes a selectable market area field 205 through which a user can select specific market areas and view the associated schedule of available advertising impressions. The currently selected market area is identified within field 212. In a similar manner, the grid depicted in display region 196 includes a selectable ad space field 210 through which a user can select a specific location where the advertisement is to be displayed to the targeted market segment, targeted viewer, and/or targeted household. The particular selected ad space is displayed in field 214.

To enable a viewer to select different time increments, the grid within display region 196 includes a selectable time field 216 that allows the user and/or advertiser to select the advertising inventory to be displayed within the grid. For instance, the available advertising inventory for one (1) hour periods are displayed within inventory grid 220 because time field 216 is selected to display inventory in one (1) hour periods. When a user and/or advertiser selects a thirty (30) minute period or a six (6) hour period, inventory grid 220 displays available advertising inventory for each thirty (30) minute period or a six (6) hour period respectively.

The inventory grid 220 includes one or more rows, one row for each calendar date between the date defined in start date field 180 and stop date field 182. Each time period of each row is divided into three columns, one for the total inventory for the time period, one for the total available inventory, and one for the requested inventory, as designated by reference numerals 222, 224, and 226 respectively. Further, inventory grid 220 includes one or more total fields 227a, 227b, 227c having values indicative of the total inventory, the total available inventory, and the total requested inventory for the respective columns. Additionally, inventory grid 220 includes grand total columns that have values indicative of the total inventory, the total available inventory, and the total requested inventory for the period of time defined by start date field 180 and stop date field 182, i.e., between 6:00 pm and 8:00 pm in this illustrative example.

With reference to FIG. 7, when the user and/or advertiser selects to book the requested advertising campaign, such as through activating button 178, planning module 12 and/or reservation module 32 generates a dialog box or other similar prompt that warns the user and/or advertiser about the conflict between the requested advertising campaign and the currently available advertising inventory. This prompt provides the user and/or advertiser with the option of booking the campaign, canceling the campaign, or adjusting the campaign. In the event that the user and/or advertiser select to adjust the campaign, planning module 12 and/or reservation module 32 automatically generates a list of potential modifications to the advertising campaign. For instance, planning module 12 and/or reservation module 32 can break the overall campaign into hourly, daily, weekly, or the like sub-campaigns and modify the impression goals for each separate sub-campaign based upon the available advertising inventory and achieving the impression goal for the overall campaign, such as by increasing impression goals where there is a surplus of advertising inventory to offset sub-campaigns that have an impression goal deficiency.

Various other manners are known to those skilled in the art to present available and scheduled advertising inventory, advertising impression goals, or the like, to an individual. For instance, in another configuration, this information can be displayed through use of drop down menus, where each specific menu includes a number of sub-menus to enable the individual to select particular times and target information. In another configuration, the graphical display includes a plurality of linked folders, or the like.

The interface module 30 displays the available inventory for the particular times and other target criteria defined by the advertiser of the advertisement. Further, interface module 30 displays previously committed advertising inventory, i.e., advertising inventory that has been committed to the same or other advertisers. For instance, when an advertiser requests an advertising impression goal of 1,000,000 impressions in a particular geographic area, at a particular time, to a particular demographic group of individuals, interface module 30 displays information indicative of the scheduled number of impressions at those times, for that particular geographic area, for that particular demographic group to achieve the advertising impression goal.

Additionally, interface module 30 provides the interface through which the individual can query a data module 34 and/or reservation module 32 to identify the availability of advertisements. Further, interface module 30 enables an individual to view a schedule of committed or flexible advertisements, request and receive reports indicating scheduled and unscheduled advertising inventory by target criteria, combinations thereof, or the like.

Furthermore, interface module 30 may be used to deliver reports to the user on completed advertising campaigns or campaigns in progress. These reports may include, but are not limited to, information about the status of a campaign, the number of impressions delivered, the expected delivery of impressions, and the like. Such reports may be used by the broadcaster and advertiser to monitor or analyze the campaign.

Communicating with reservation module 32 is aggregation module 36. Aggregation module 36 is configured to receive historical advertising inventory data and currently scheduled advertising inventory, i.e., currently scheduled advertising impressions, to generate data representative of the estimated and/or actual available advertising inventory. The historical data and data indicative of the scheduled advertising inventory can be received from reservation module 32, which receives the same from control module 16, or can be received directly from control module 16, as indicated by dotted lines.

The aggregation module 36 receives the scheduled advertising inventory of advertising impressions and merges this data with the historical advertising delivery data to estimate available inventory for additional or future campaigns. Through combining the predicted usage with the scheduled commitments, aggregation module 36 generates the advertising inventory to be stored in data module 34 and manipulated by reservation module 32. Four numeric measures: total inventory attribute 70, total committed inventory attribute 72, total available inventory attribute 74, and total flexible weight attribute 76 are computed based on the aggregated historical data and currently scheduled advertising inventory of advertising impressions. Total inventory is the total number of advertising impressions available for a given target cell in the multi-dimensional structure, and is defined based on compiled historical data. Total committed inventory is the total number of advertising impressions that have been scheduled for committed advertisements. This numeric measure is calculated by summing all currently scheduled committed advertising impressions for each given target cell. Another numeric measure is the total available inventory. Total available inventory is the remaining advertising impression inventory available for advertisers or campaign managers to select for new advertisements. Total available inventory is calculated by subtracting the total committed inventory 72 from the total inventory 70 for a given target cell. Total flexible weight 76 is the sum of the weights of currently scheduled flexible advertisements.

Communicating with planning module 12 through network 14 is control module 16. Control module 16 includes a manager module 40, an advertising module 42, and a historical data module 44. Manager module 40 is capable of controlling the delivery of advertising content associated with the scheduled advertisements to receiver module 20 for display to the viewer in accordance with the schedule defined in planning module 12 to achieve the advertising impression goal. Accordingly, manager module 40 receives from reservation module 32 data defining when the advertisement content of the advertisement is to be displayed to the viewer, an indicator of whether the advertisement is scheduled as committed or flexible advertising, and the advertisement's associated weight, the weight to be interpreted by receiver module 20 as absolute or relative depending on the committed or flexible advertising indicator. The manager module 40 receives such information or data continuously, periodically, sporadically, upon request by an individual, in accordance with an individual's defined schedule, combinations thereof, or the like.

Using this information and data, manager module 40 generates one or more metadata files associated with the advertisement content of the advertisement to be delivered to receiver module 20. These metadata files define advertisements available for display to the viewer when such advertisement is requested. For instance, each different advertisement delivered to receiver module 20 has different weights, priorities, location placement on the documents displayed by receiver module 20, or the like.

The metadata files can define information for individual advertisements and the associated advertisement content, groups of related or unrelated advertisements and the associated advertisement content, campaigns of advertisements and the associated advertisement content, combinations thereof, or the like. The metadata files have a simplified format that defines various attributes and properties associated with the advertisement, including the advertisement content, i.e., the range of time when the advertisement may be displayed to fulfill the number of advertising impressions requested by an advertiser.

Manager module 40 generates metadata for the advertisement to be displayed to the viewer. The manager module 40 retrieves a metadata template and propagates the attributes or elements of the template with data or information specific for the advertisement to be displayed to the viewer. Below is an illustrative metadata file specific to the situation where advertisement is to be displayed as a banner advertisement on a Hypertext Markup Language (HTML) web page displayed using receiver module 20.

The "Ad element" is the top-level element and defines and/or contains all of the metadata for the advertisement content. The "ID attribute" of the ad element uniquely identifies the advertisement content and is defined by control module 16.

The "Ad Type" attribute indicates whether the advertisement is scheduled as a committed advertisement or a flexible advertisement.

The "Ad Weight" attribute is a numeric number to be interpreted by receiver module 20. Receiver module 20 treats the ad weight as an absolute weight when the ad type is "Committed," and treats the weight as a relative weight when the ad type is set to "Flexible."

The "Schedule element" describes when the advertisement content may be shown to the viewer. The schedule element includes a number of elements: a time element, a duration element, and a base element. When used without a Repeat sub-element, as will be described hereinafter, the Time attribute indicates the start time of the advertisement content and the duration attribute specifies how long the advertisement content may be chosen for display to the viewer. The Base attribute indicates whether the Time attribute should be interpreted as a Coordinated Universal Time (UTC) time or as the receiver's local time irrespective of its time zone.

The "Exception element" is optional and indicates time-zone specific exceptions to the scheduled time, as defined in the schedule element. The Zone attribute indicates the targeted time zone for the advertisement content and includes a Duration attribute indicating the number of seconds that the target time zone differs from the defined time zone. The Offset attribute is added to the scheduled start time to designate when the time-shift indicated by the Shift attribute is to be applied.

The "Repeat element" is optional and describes additional scheduling information for advertisement content that runs over multiple time intervals. When a Repeat element is defined, the Time and Duration attributes are interpreted as the start time and duration of all repeating intervals. Consequently, the interval attribute of each Repeat element indicates the duration of each repeat interval. The optional Offset sub-elements describe one or more start times for the defined repeat interval, relative to the Time attribute of the parent schedule element. In the event that no offset is defined, a default offset of 0 can be assumed.

In the example above, the duration of 3600 s indicates that each repeat occurrence lasts 1 hour, i.e., 3600 seconds. The offsets of 0 s and 86400 s indicate that the 1-hour long repeat

```
<Ad ID="12345"> Type = "Committed" Weight = 42>
    <Schedule Time="978336000000" Duration="345600s"
Base="UTC/LOCAL">
        <Exception Zone="21600s" Offset="0s" Shift="-3600s" />
        <Repeat Interval="604800s" Duration="3600s" >
            <Offset>0s</Offset>
            <Offset>86400s</Offset>
        </Repeat>
    </Schedule>
    <Target Type="Page">TVHome</Target>
    <Target Type="Area">Banner</Target>
    <Target Type="DMA">94043</Target>
    <Creative Type="img">
    %3ca
    href='file://myclickthrough.html?clickthroughFor=\"12345\"'+clickthroughFinal
    ' target='top'%3e%3cimg src='file://adimage.jpg '/%3e%3c/a%3e
    </Creative>
</Ad>
``` occurrences should start at the parent schedule start time and one day later. The interval of 604800 s or 1 week indicates that each of these repeat occurrences should run weekly.

The "Target element" describes targeting criteria for the advertisement. The type attribute describes the type of target criteria, i.e., demographic, geographic, or the like. Target types may also indicate where the advertisement may be displayed. In the sample metadata file, the advertisement content of the advertisement is scheduled for display in the banner area of a given viewer page.

The "Creative element" contains a Type attribute, which describes the creative type, and its contents are the ad creative. An example of the creative for an image link with click through metadata is shown above. The "clickthrough" related metadata embedded in the data of the Creative element is recorded within the receiver module to track when a user interacts with an advertisement.

Manager module 40 is further configured to deliver the advertisement content and associated one or more metadata files to receiver module 20 to enable receiver module 20 to display the advertisement content of the advertisement to the viewer. Manager module 40 can deliver the advertisement content and one or more metadata files of the advertisement in response to a request from receiver module 20, when manager module 40 determines that it is appropriate to deliver such content and one or more metadata files, combinations thereof or the like. For instance, manager module 40 can include one or more rules that define when to deliver the one or more metadata files and advertisement content. Illustratively, the rule can define that when the display date of the advertisement, as defined by date attribute 62 (FIG. 3), is less than three days from a current date, manager module 40 delivers the advertisement content and one or more metadata files to receiver module 20. Those skilled in the art can appreciate that many rules may be used to define when advertisement content and metadata files of one or more advertisements are to be delivered to receiver module 20.

Control module 16 further includes an advertising module 42. Advertising module 42 functions as a repository of the data associated with the advertisement that can be displayed to a viewer using receiver module 20. Advertising module 42 can include a database of stored advertisement content for advertisements, whether such advertisement content is video data, audio data, banner data, combinations thereof, or the like.

Advertising module 42 can store the data associated with the advertisement within a database associated with advertising module 42 or alternatively can access another database, designated by reference numeral 44, separate from advertising module 42, whether or not such separation is physical or virtual. The database can be hierarchal, relational, flat, or other database structure and include a database management system known to those skilled in the art. Additionally, the database can utilize modular or fixed memory, magnetic disk storage, optically read storage, or other mass storage known to one skilled in the art for storing the data or content associated with the advertisement. Although a single database is illustrated, alternate embodiments of the present invention can utilize multiple or a plurality of databases.

The advertisement data and/or content stored within the database associated with advertising module 42 can be stored in a variety of manners. For example, the data or content can be stored in a carousel that is accessible to advertising module 42 and manager module 40.

Additionally, advertising module 42 can store the data or content in: (i) alphabetical order; (ii) category order, where advertisement content of the advertisement directed to a particular grouping of advertisements is stored together; (iii) Calendar order, where days, weeks, months, etc. of advertisement content of the advertisement are stored together for delivery to receiver modules 20; (iv) viewer selection order, or the like.

Generally, the advertisement content of the advertisement includes one or more identifiers that associate the one or more advertising campaigns and/or one or more metadata file with delivery and weighting information. The manager module 40 can select the desired advertisement, and hence the associated advertisement content, based upon such attributes and deliver the advertisement content, with associated metadata or metadata file(s), of the advertisement to receiver module 20 for display to the targeted viewer.

According to another aspect of control module 16, manager module 40 communicates with historical data module 46. The historical data module 46, either directly from receiver module 20 or via manager module 40, retrieves historical viewer data from receiver module 20. For example, the historical data can include details of broadcast programming viewed, advertisements viewed, or the like based upon day, time, month, etc. Additionally, historical data may include details about previously viewed advertisements such as the target information associated with those advertisements or any actions taken by the viewer upon seeing the advertisement such as requesting additional information or the like.

Figure 8:
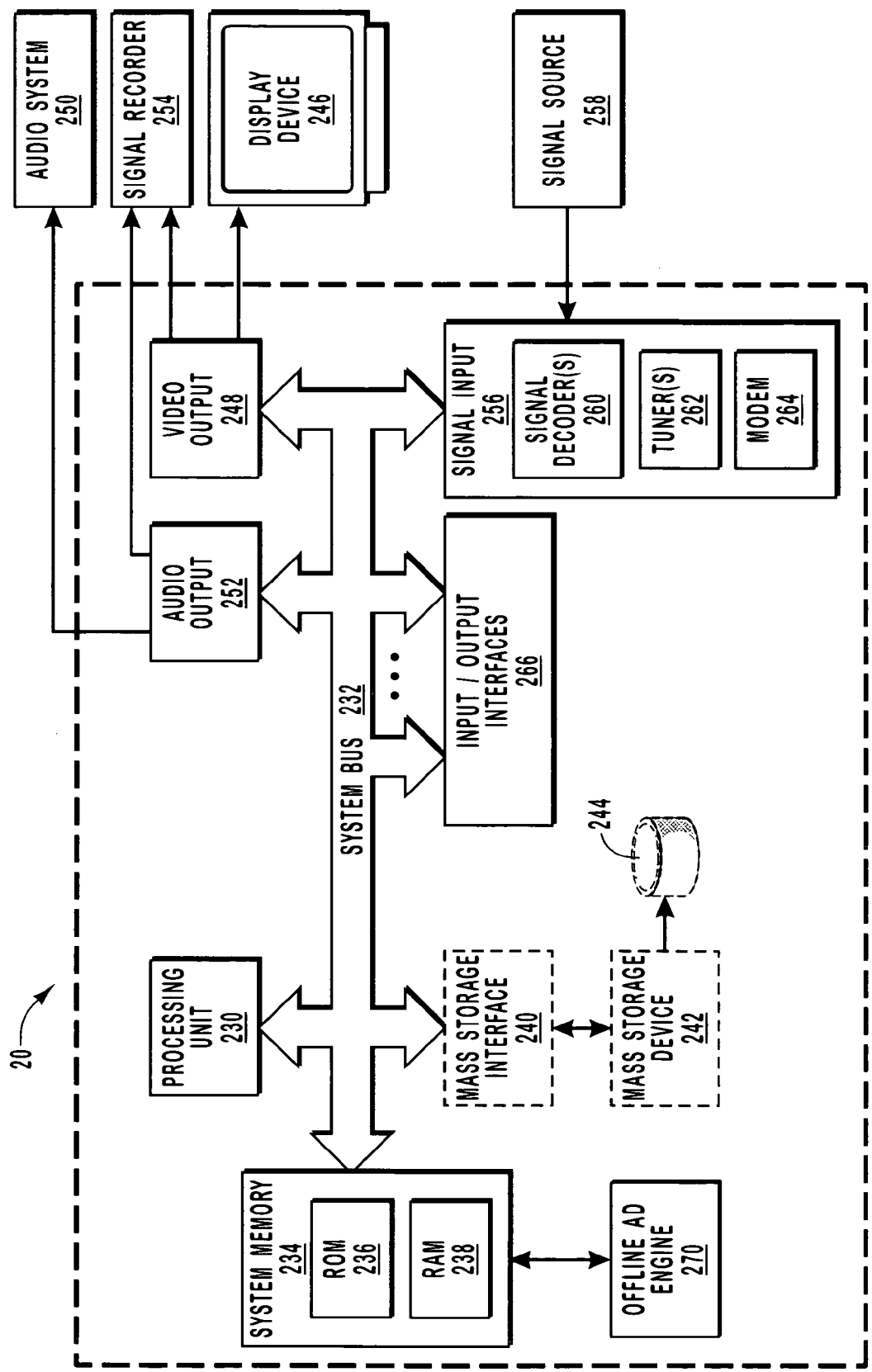
FIG. 8 illustrates a schematic representation of an exemplary receiver module of the system of FIG. 1.

Communicating with control module 16 is receiver module 20. Referring now to FIG. 8, receiver module 20 can include a central processing unit 230 that uses computer-executable instructions implemented in software and/or hardwired logic circuitry to perform various functions. These computer-executable instructions, such as program modules, cause receiving module 20 to perform a certain function or group of functions. Generally, program modules can include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processing unit 230 can be coupled via a system bus 232, which also interconnects various other system components of receiver module 20. Processing unit 230 executes software designed to implement features of receiver module 20 including the features of the present invention. Processing unit 230 can contain circuitry that is used to implement certain functions of receiver module 20. Instructions, data, and other software used to operate processing unit 230 can be stored in a system memory 234, such as read-only memory ("ROM") 236 and/or in random-access memory ("RAM") 238. Optionally, receiver 20 can include any mass storage device 242, which is coupled to a mass storage interface 240, as illustrated in dotted lines. ROM 236, RAM 238 and mass storage device 242 are communicatively coupled to processing unit 230 so as to be readable by processing unit 230 and so that data may be written from processing unit 230 to RAM 238 and possibly mass storage device 242.

Optional mass storage device 242 can be a magnetic hard disk 244 or any other magnetic, optical, or other mass memory device that is capable of storing data. Any desired computer-readable instructions or data, including application programs and other program modules can be stored in mass storage device 242. Mass storage device 242 is one structure capable of performing the function of a computer-readable media for carrying or having computer-executable instructions or data structures stored thereon. In addition, mass storage device 242 may be used to store and retrieve received media content, such as a media stream or other data delivered to the receiver. This computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to receiver module 20 or some remote computer, both the receiver module 20 and remote computer, such as but not limited to control module 16, properly view the connection as a computer-readable medium. Thus, such a connection is also properly termed a computer-readable medium. Combinations of the above should also be included within the scope of computer-readable media.

As illustrated, receiver module 20 communicates with a display device 246, such as a television display, a flat panel display, a projection display, a computer monitor, or any other device capable of displaying viewable image data, through a video output 248 and variety of different communication line connections known to one skilled in the art in light of the teaching contained herein. Additionally, receiver module 20 can communicate with an audio system 250, such as one or more speakers for emitting sound data through an audio output 252 and/or a signal recorder 254, such as a video cassette recorder ("VCR"), capable of receiving video and/or audio data through video output 248 and audio output 252 and recording the data on a storage medium.

The receiver module 20 can include a signal input 256, which receives programming channels and advertisement content from one or more signal sources 258, such as control module 16. These signal sources 158 deliver single or multiple channels of programming to signal input 258 via one or more different communication line connections, known to one skilled in the art, such as but not limited to electromagnetic radiation connection, such as wireless, UHF, VHF, microwave transmission, or the like, cable connection, or optic connection.

According to another aspect, signal input 256 can include one or more tuners 262 capable of tuning to the programming channels deliverable by signal source 258. Additionally, signal input 256 can include one or more signal decoders 260 optionally configured to (i) decipher the audio and/or video data representative of the programming channels received from signal source 258, (ii) convert the data from an analog format to digital format, and vice versa, and (iii) decompress the audio and/or video data received from signal source 258.

According to another aspect of the present invention, signal input 256 includes a modem 264 that translates the digital signaling from the signal source 158 into locally readable/executable internet content, including but not limited to: HTML, XML, Streaming Media formats and other common "Web" encoding methods enables receiver module 20 to display Web pages including text, graphics and other static media/data and streaming media or other continuous media from remote sources. In such a case, signal source 258 can have the form of a remote computer, which forms part of the Internet or some other wide area network or local area network.

Further, receiver module 20 includes various input/output interfaces 266 that enable a user, consumer electronic devices, signal sources, or other suitable electronic devices to deliver and receive data or information therebetween. For instance, illustrative input/output interfaces include but are not limited to serial port interface, parallel port interface, infra-red interfaces, wireless interfaces, a universal serial bus (USB), Small Computer System Interface (SCSI), or the like.

In addition to the above functional aspects of receiver module 20, receiver module 20 includes an offline ad engine 270. Offline ad engine 270 is configured to receive advertisement content and one or more metadata files of the advertisements from control module 16. The advertisement content and one or more metadata files are stored in mass storage device 242 and/or system memory 238 and accessible by offline ad engine 270. The offline ad engine 270 is configured to retrieve the stored advertisement content and one or more metadata files of the advertisements at the prescribed time and thereafter display the advertisement content of the advertisement to the viewer through display device 246 to achieve the advertising impression goal defined in planning module 12 (FIG. 2).

Accordingly, offline ad engine 270 is configured to analyze the received advertisement content and one or more metadata files of the advertisement to interpret the information about the advertising type and weight of the advertisement to be displayed to the viewer in accordance with defined target criteria, i.e., at a particular time. Specifically, through analyzing the different advertising types (i.e. whether the advertisement is committed or flexible) and weights of different available advertisement content of the advertisement, offline ad engine 270 is able to manage the selection and display of available advertisement. Consequently, offline ad engine 270 facilitates the delivery of a sufficient number of impressions to conform to the requested campaign scheduled through planning module 12 (FIG. 2).

The offline ad engine 270 has knowledge of committed and flexible advertising types. Offline ad engine 270 is able to identify which advertisement, and hence associated advertisement content, has been scheduled as committed advertisements and which advertisements have been scheduled as flexible advertisements by referencing the Ad Type attribute in the metadata files described above. The advertisement that has a committed attribute is "committed" to be displayed a certain number of impressions. Receiver module 20 has instructions to interpret the advertisement weight for committed advertisements as absolute weights. All other advertisements, i.e., filler advertisements having a flexible attribute, are used to fill in the remainder of the advertising inventory for a specific target criteria for the receiver module receiving the advertisements. Thus, the offline ad engine is capable of managing both absolute and relative weights for the advertisements to be delivered or displayed by receiver module 20.

Furthermore, the offline ad engine is also able to determine when committed advertisements have been overbooked. Committed advertising is overbooked when the sum of the weights for committed advertisements, on a receiver, applicable to a specific time and target, exceeds the value of the base factor. For example, if the weights are based upon a base factor of 100, i.e., a percentage scale, the overbooked scenario occurs when the sum of the weights for committed advertisements exceeds 100%. Alternatively, when the base factor is 1000, the overbooked scenario occurs when the sum of the weights for committed advertisements exceeds a value of 1000. Although reference is made to base factors of 100 and 1000, one skilled in the art can appreciate that the base factor can be any number, resulting in any scale used to define the weights.

When the overbook scenario occurs, the offline ad engine is able to reinterpret the ad weights when necessary. For instance, the offline ad engine holds instructions for reinterpreting the weights for committed advertisements as relative weights when advertising inventory has been overbooked.

Using this technique of mixed absolute and relative weights for committed and flexible advertisements, advertisements are always available to fill advertising inventory and committed inventory will meet its overall impression goals. Further, this mixed technique enables offline ad engine 270 to display flexible advertisements over time depending on what committed advertisements are scheduled for the same time and target. Consequently, when offline ad engine 270 analyzes the received one or more metadata files and advertisement content for one or more advertisements to identify the quantity of advertisements available to be displayed to the viewer, offline ad engine 270 is able to "fill in" unused advertising inventory with the flexible advertisements. For example, in the event that a target area does not have sufficient committed advertisements to fill the available advertising inventory, offline ad engine 270 can select national or local advertisements that are rated as flexible advertisements to fill the remaining advertising inventory.

The mixed weight system and the functionality of receiver module 20 and offline ad engine 270 can be demonstrated using the following example. In the example, local advertisements will be treated as committed advertisements and given absolute weightings, while the national and default advertisements will be used as flexible advertisements, which are given relative weightings.

Illustrated in Table 1 is one example of summary information that may be contained within the metadata file for the advertisements. Each of the referenced values is associated with particular attributes and elements of the one or more metadata file and/or data module 34 (FIG. 2).

TABLE 1

|  | Ad Name | | | |
| --- | --- | --- | --- | --- |
|  | Ad 1 | Ad 2 | Ad 3 | Ad 4 Default/House |
| Market Area | New York | Nationwide | New York | Nationwide |
| Ad Space | EPG | EPG | EPG | EPG |
| Day Part | Daily 7-9 PM | Daily 7-9 PM | Daily 7-9 PM | Any |
| Duration | 2 weeks | 2 weeks | 2 weeks | Any |
| Total Inventory | 1 million | 20 million | 1 million | 100 million |
| Impression Goal | 250,000 | 5 million | 500,000 | None |
| Advertising Type | Committed | Flexible | Committed | Flexible |

The advertisements Ad1, Ad2, Ad3, and Ad4 are available to be displayed at a particular time, i.e., daily between 7-9 pm or at any time, for particular geographic locations, i.e., New York, Nationwide, or Default. Additionally, the advertisements can be displayed at various different locations with the broadcast programming or HTML pages displayed through an interactive experience. For instance, in this illustrative configuration, the available advertisements are to be displayed as part of an electronic program guide (EPG) displayed to the viewer. Alternatively, the advertisements can be displayed as part of an interactive television web page, between portions of broadcast programming, or the like.

The available advertisements Ad1, Ad2, Ad3, and Ad4 each have a defined duration within which the advertisement is to be displayed. In one configuration, such duration information is stored at control module 14 and/or planning module 12 when a limited amount of advertisements, including associated advertisement content, are delivered to receiver module 20. In other configurations, such duration information is delivered as part of the one or more metadata files to receiver module 20 and stored therein. Illustratively, the duration of the advertising campaign associated with Ad1, Ad2, and Ad3 is two weeks, while the duration of Ad4 advertising campaign is any amount of time.

Additionally, available advertising inventory and impression goals specific for the advertisements Ad1, Ad2, Ad3, and Ad4 are defined in the one or more metadata files and/or at data module 34 (FIG. 2). This defines the number of impressions that are to be achieved for the particular advertisements Ad1, Ad2, Ad3, and Ad4. Finally, the advertisements and/or the advertisement content associated with the advertisements Ad1, Ad2, Ad3, and Ad4 includes attributes that define whether the advertisements are committed or flexible advertisements, as described herein.

Upon receiving the advertisement content and the one or more metadata files for each scheduled advertisement, offline ad engine 270 identifies the absolute weightings for the local or committed advertisements. The absolute weightings are calculated as the impression goal for the specific committed advertisement divided by the total inventory. Illustratively, when the weights are calculated based upon a percentage scale, i.e., a base factor of 100, as illustrated in Table 2, Ad1 has an absolute weight of 25% and Ad3 has an absolute weight of 50%. The total committed inventory is the sum of these two weights, i.e., 75% for the case when the weights use a base factor of 100, i.e., a percentage scale. Similarly, when the base factor is 1000 and the weights are 250 and 500 respectively, the total committed inventory is 750. In another configuration, the base factor could be 1, such that the weights are 0.25 and 0.50, with a total committed inventory of 0.75.

TABLE 2

|  | Ad 1 | Ad 3 |
| --- | --- | --- |
| Impression | 250,000 | 500,000 |
| Inventory | 1,000,000 | 1,000,000 |
| Divide Goal by Available Inventory in New York | 250,000/1,000,000 | 500,000/1,000,000 |
| Advertisement Mix (Using a Base Factor of 100, i.e., percentage scale) | 25% | 50% |
| Total Committed Inventory Percentage | 25% + 50% = 75% | |

Offline ad engine 270 also determines which advertisements to display for the remainder of the available advertising inventory, i.e., the total available flexible advertising inventory percentage=100%−total committed advertising inventory percentage when using a base factor of 100. For example, 100%−(25%+50%)=25%. Similarly, when the base factor is 1000, the available advertising inventory=Base Factor Value−total committed advertising inventory, i.e., 1000−(250+500)=250. This remaining advertising inventory is filled with flexible advertisements.

Offline ad engine 270 selects the relative weights defined by the individual during scheduling of the flexible advertising impressions, i.e., 10 for Ad2 and 1 for Ad4 and in association with processing unit 230, offline ad engine 270 defines a total flexible weight as the sum of available flexible advertisement weights. Subsequently, offline ad engine 270 creates a mix of flexible advertisements to be displayed to the viewer by dividing the relative weight of the advertisements by the total flexible weight, and multiplying the result by the flexible advertising inventory percentage, as illustrated below in Table 3. Alternatively, offline ad engine 270 creates a mix of flexible advertisements to be displayed to the viewer by dividing the relative weight of the advertisements by the total flexible weight, and multiplying the result by the flexible advertising inventory, when the base factor is some value different from 100, i.e., different from a percentage scale.

TABLE 3

|  | Ad 2 | Ad 4 | Total |
|---|---|---|---|
| Relative Weight | 10 | 1 | 11 |
| Relative Mix | 10/11 = 0.91 | 1/11 = 0.09 | 1 |
| Delivered Ad Mix | 25% * 0.91 = 22.8% | 25% * 0.09 = 2.2% | 25% |

Consequently, Ad2, with a higher priority, will be shown 22.8% of the time while Ad4 will only be shown 2.2% of the time on the receiver module, when a base factor of 100 is used. Therefore, this mixed weighting system guarantees impressions for committed advertisements and allows for flexibility in controlling relative weights for the lower priority ads.

In some circumstances, the total of all committed advertisements is greater than all of the available advertising inventory. This can occur when an individual overbooks the available number of advertising impressions. In this case, no flexible advertisements will be displayed to the viewer. Additionally, the display frequency for each committed advertisements is calculated relative to all other committed advertisements, i.e., the absolute weights are used as a relative weight. Consequently, the display frequency for each committed advertisement is calculated in accordance with the equation:

$$AW_N = (NW_N / \Sigma(\text{Nominal Weights})) * \text{Base Factor};$$

where $AW_N$ is the adjusted weight for the Nth committed advertisement, and $NW_N$ is the nominal, or original, weight of the Nth advertisement.

Illustratively, in the event that each committed advertisements designated by Ad1, Ad2, and Ad3 is scheduled in the nominal weights of 40, 40, and 50, having a total of 130, the adjusted weights, or the display frequency of advertisements Ad1, Ad2, and Ad3, based upon a base factor of 100, would become approximately 30.77, 30.77, and 38.46, respectively.

Figure 9:
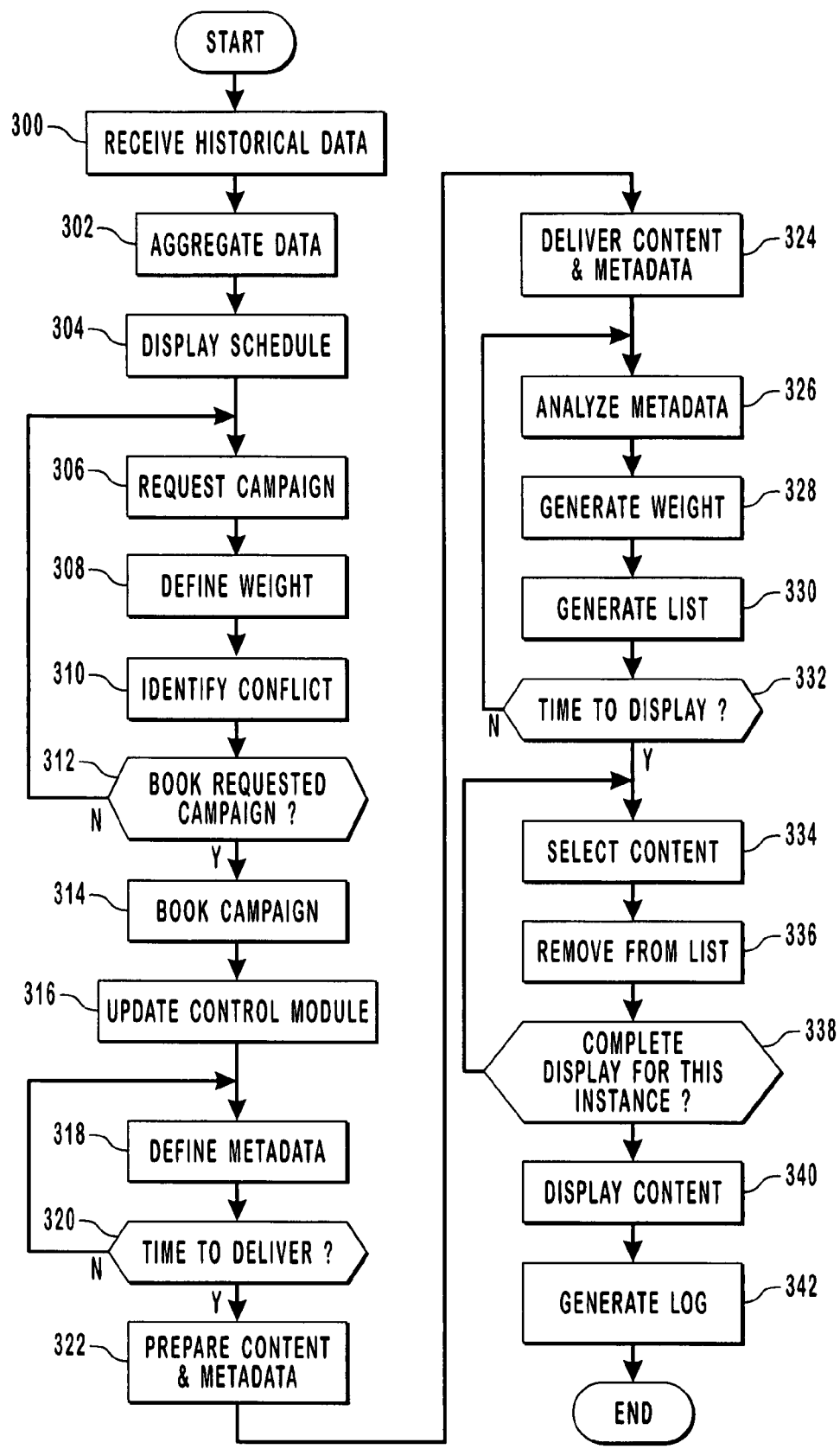
FIG. 9 illustrates a flow diagram depicting one exemplary method of the present invention.

Referring now to FIG. 9, depicted is a flow diagram representation of the method by which advertising inventory is scheduled, the control module is updated, and the receiver module receives the scheduled advertisements, including advertisement content and metadata files, and displays the same to the viewer. Although reference is made to the following method, it can be understood by one skilled in the art that various other methods are appropriate and the particular order by which the steps are discussed are exemplary and not limiting to performing the steps in other orders, adding other steps, eliminating steps, combinations thereof, or the like.

As illustrated, the planning module receives historical data and currently scheduled advertising inventory of advertising impressions, as represented by block 300. Upon receiving such data and schedule, the planning module aggregates the data and schedule to define the actual and/or estimated available and sold advertising inventory, as represented by block 302. This advertising inventory can be displayed to an individual, as represented by block 304. For instance, the sold advertising inventory and/or available advertising inventory are displayed using a graphical user interface.

Once the advertising inventory is displayed to the individual, an advertiser, optionally through the individual and associated hardware device, can request to schedule an advertising campaign, as represented by block 306. Illustratively, an advertiser can contact the provider of advertising inventory, such as a cable or satellite provider, and request the display of advertisement content to a specific target audience, i.e., geographic area, demographic data, specific times, etc. Additionally, the advertiser can request the display of a number of impressions to such an audience, i.e., the advertising impression goal. The advertiser and/or broadcaster may also request if the advertisement should be regarded as a committed or flexible advertisement.

Once the advertisement content is requested, weights are defined for desired committed advertisements and the desired flexible advertisements, as represented by block 308. These weights are used as either absolute or relative weights by the receiver module to select the particular advertisement, and associated advertisement content, to display at any particular time, upon completing the booking or scheduling of the advertising campaign.

Utilizing the planning module, the individual can identify conflicts, if any exist, between the requested advertising impressions and the scheduled committed advertisement(s), as represented by block 310. When there is a conflict, i.e., scheduled committed advertisement(s) and requested impressions coincide, the individual can select to reschedule or request a different advertising campaign, as represented by decision block 312 is in the negative. Alternatively, the individual can double-book or overbook the particular advertising inventory for a specific target, as represented by decision block 312 being in the positive, and subsequently booking the advertising campaign, as represented by block 314.

The schedule of advertising inventory, with associated advertising types and advertisement weights, is delivered to the control module and used to update the stored schedule therein, as represented by block 316. Subsequent to receiving the advertisement content for the advertisement and indicators of the advertisement's type and weight, the control module defines one or more metadata files for the one or more advertisement to be delivered to the receiver module, as represented by block 318. For example, one metadata file is created for the available advertisement. In another configuration, one metadata file contains information about the advertisement to be displayed in a defined time period, i.e., 15 minutes interval, 1 hour interval, 6 hour interval, daily interval, weekly interval, monthly interval, or the like.

The control module identifies when it is time to deliver the advertisement content and one or more metadata files for the advertisement to the receiver module, as represented by decision block 320. The control module can achieve this by comparing the delivery date defined within the one or more metadata files against stored rules that govern when the advertisement content and the one or more metadata files are to be delivered to the receiver module. When the content and one or more metadata files are to be delivered to the receiver module, i.e., decision block 320 is in the affirmative, the control module prepares the content and one or more metadata files and delivers the content and the one or more metadata files, as represented by blocks 322 and 324 respectively.

Upon receiving a request for an advertisement, and hence advertisement content, for a specified location and target criteria, the receiver module analyzes the one or more metadata files to as represented by block 326, to identify when the advertisement content of the advertisement is to be displayed to the viewer, as represented by block 332. Further, the receiver module generates a list of advertisements and/or advertisement content for the advertisements that are to be displayed in accordance with the target criteria defined with the one or more metadata files, as represented by block 330. Consequently, the receiver module interprets the weights, whether absolute or relative weights based upon the available advertisements that meet the target criteria, as represented by block 328.

Illustratively, the receiver module sums the weights for each of the committed advertisements. In the event that the summation results in total number of committed advertisement of less than the base factor, such as 100% when the base factor is 100, then the weight of the committed advertisement is used as the weight for displaying the advertisement, as represented by block 328. Consequently, the available flexible advertisement is weighted based upon the available remaining advertising inventory.

Otherwise, when the summation results in total number of committed advertisements is greater than the base factor, such as 100%, when the base factor is 100, the weights of the committed advertisements are used as relative weights and the actual display percentages for the committed advertisements are the normalized values for each of the committed advertisements, as described above. Consequently, the relative weight of the available flexible advertisements is defined as zero.

Upon retrieving the desired advertisement content, as represented by block 334, the receiver module displays the advertisement content, as represented by blocks 338 and 340 and generates a log of the impression log for the displayed advertisement, as represented by block 342. If the user interacts with the advertisement, clicking on the advertisement content displayed to the viewer using an input device, another log is made of the "click through" activity. These logs can be subsequently uploaded to the control module and the planning module as part of the historical data.

Consequently, one receiver module of the present invention makes an advertisement selection decision on-demand for specific target criteria, including time, market area, demographics, etc. That is, the receiver module selects the particular advertisement content associated with scheduled advertisements when the broadcast programming, electronic program guide, web page, etc. includes a location or advertisement space for an advertisement. Alternatively, the receiver module can make the advertisement selection decision upon receiving the advertising content and metadata from the control module. For instance, the receiver module analyzes the metadata for the advertisement content upon receiving the same, and subsequently generates a display list of advertisement content based upon the absolute weights and flexible weights of the advertisements. The receiver module, therefore, waits for a request for advertisement content or one or more advertisements to be displayed to the viewer and selects one of the available advertisements as represented by block 334. Thereafter, the receiver module removes that particular instance of the advertisement from the list, as represented by block 336, and requests additional advertisements as needed.

In still another configuration, the receiver module can define a list of displayable advertisement content based upon one or more of the specific target criteria, such as a specific time interval when the advertisement content can be displayed, e.g., selecting advertisement content that is to be displayed between 7:00 pm and 8:00 pm, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

What is claimed is:

1. A method for selecting an advertisement to be displayed to a viewer at a client system that is in communication with a server system that sends the advertisement to the client system with metadata files that the client system uses to determine when to display the advertisement to a viewer at a display of the client system, wherein the client system includes at least one processor and display that are configured to display the advertisement in accordance with available advertising inventory, as determined at the client system, the method comprising:

receiving, by a receiver module of a client system that comprises at least one of a set-top box, a cable televisions box, a DVB, a DSS and a cell phone with a digital display, at least one data file defining each of a plurality of advertisements as committed advertisements and flexible advertisements, wherein each committed advertisement is an advertisement that a broadcaster, which is independent of the client system, has committed to broadcasting as part of an advertising campaign, and wherein each flexible advertisement is an advertisement that operates as a filler advertisement to be displayed when advertising inventory exists in excess of advertising utilized by the committed advertisements;

the client system receiver module identifying, for each committed advertisement, a first absolute weight corresponding to a guaranteed impression frequency for displaying each corresponding committed advertisement;

identifying, for each flexible advertisement, a relative weight;

defining a total flexible advertising inventory percentage as a difference between a sum of the first absolute weights for the committed advertisements and 100%;

defining a second absolute weight for each of the flexible advertisements, corresponding to a display frequency for the flexible advertisements, and based upon the relative weight of the flexible advertisements, the sum of the relative weights of the flexible advertisements, and the total flexible advertising inventory percentage; and selecting the committed and flexible advertisements for display based upon the first absolute weight of the committed advertisements and a second absolute weight of the flexible advertisements.

2. A method as recited in claim 1, further comprising generating a display frequency, at the receiver module, for each of the flexible advertisements.

3. A method as recited in claim 2, further comprising generating the display frequency for the committed advertisements before the flexible advertisements.

4. A method as recited in claim 1, wherein receiving the at least one data file comprises periodically, sporadically, or continuously receiving the at least one data file.

5. A method as recited in claim 1, further comprising selecting advertisements for display using target information, the target being defined by one or more viewer demographic characteristics.

6. A method as recited in claim 1, wherein selecting advertisements comprises:
defining a list of available advertisements from the committed advertisements and the flexible advertisements.

7. A method as recited in claim 6, further comprising removing advertisements from the list of available advertisements where target values of said advertisements are not valid for a chosen display area and viewer demographics.

8. A method as recited in claim 6, further comprising displaying the selected advertisements within a document displayable through the receiver module and removing the selected advertisements from the list of available advertisements.

9. A method as recited in claim 6, further comprising:
displaying the selected advertisements from the list of available advertisements; and
removing the selected advertisements from the list of available advertisements for subsequent requests for advertisements within the current instance of the document.

10. A method as recited in claim 1, further comprising generating a log of the advertisements displayed to the viewer.

11. A method as recited in claim 7, further comprising transmitting a log to a control module.

12. A method as recited in claim 1, further comprising:
displaying one or more advertisements;
receiving viewer interaction; and
generating a log of the advertisements interacted with by the viewer.

13. A method as recited in claim 1, wherein the selection of the committed and flexible advertisements is further based at least in part on a current time.

14. A method as recited in claim 1, wherein the client system receiver module also identifies which advertisements are valid for a specified advertisement location and time.

15. A method as recited in claim 1, wherein the second absolute weight assigned to each flexible advertisement is assigned proportionally based upon each flexible advertisement's flexible weight as a proportion of a sum of all flexible weights of all the flexible advertisements and the total flexible advertising inventory percentage.

16. A method as recited in claim 1, wherein receiving the at least one data file causes the client system to delete previously stored advertising content and metadata files.

17. A computer program product comprising:
one or more computer readable storage media with stored computer executable instructions that, when executed, implement a method for selecting an advertisement to be displayed to a viewer at a client system that is in communication with a server system that sends the advertisement to the client system with metadata files that the client system uses to determine when to display the advertisement to a viewer at a display of the client system, wherein the client system includes at least one processor and display that are configured to display the advertisement in accordance with available advertising inventory, as determined at the client system, and wherein the method comprises:
receiving, by a receiver module of a client system that comprises at least one of a set-top box, a cable televisions box, a DVB, a DSS and a cell phone with a digital display, at least one data file defining each of a plurality of advertisements as committed advertisements and flexible advertisements, wherein each committed advertisement is an advertisement that a broadcaster, which is independent of the client system, has committed to broadcasting as part of an advertising campaign, and wherein each flexible advertisement is an advertisement that operates as a filler advertisement to be displayed when advertising inventory exists in excess of advertising utilized by the committed advertisements;
the client system receiver module
identifying, for each committed advertisement, a first absolute weight corresponding to a guaranteed impression frequency for displaying each corresponding committed advertisement;
identifying, for each flexible advertisement, a relative weight;
defining a total flexible advertising inventory percentage as a difference between a sum of the first absolute weights for the committed advertisements and 100%;
defining a second absolute weight for each of the flexible advertisements, corresponding to a display frequency for the flexible advertisements, and based upon the relative weight of the flexible advertisements, the sum of the relative weights of the flexible advertisements, and the total flexible advertising inventory percentage; and
selecting the committed and flexible advertisements for display based upon the first absolute weight of the committed advertisements and a second absolute weight of the flexible advertisements.

18. A computer program product as recited in claim 17, the method further comprising generating a display frequency, at the receiver module, for each of the flexible advertisements.

19. A computer program product as recited in claim 18, the method further comprising:
generating the display frequency for the committed advertisements before the flexible advertisements; and
selecting the advertisements based upon the display frequency of the committed advertisements and the flexible advertisements.

20. A computer program product as recited in claim 17, the method further comprising selecting advertisements for display using target information, the target being defined by one or more viewer demographic characteristics.

21. A computer program product as recited in claim 17, wherein selecting advertisements comprises:
defining a list of available advertisements from the committed advertisements and the flexible advertisements;
removing advertisements from the list of available advertisements where target values of said advertisements are not valid for a chosen display area and viewer demographics; and
selecting the advertisements from the list of available advertisements based upon the display frequency.

22. A computer program product as recited in claim 21, the method further comprising:
displaying the selected advertisements from the list of available advertisements; and
removing the selected advertisements from the list of available advertisements for subsequent requests for advertisements within the current instance of the document.

23. A computer program product as recited in claim 17, the method further comprising:
displaying one or more advertisements;
receiving viewer interaction;
generating a log of the advertisements displayed to the viewer; and
generating a log of the advertisements interacted with by the viewer.

* * * * *